United States Patent
Rivera et al.

(10) Patent No.: US 10,620,449 B2
(45) Date of Patent: Apr. 14, 2020

(54) LOW-SPECKLE LIGHT SOURCE AND IMAGING DEVICES WITH MICRO-REFRACTIVE ELEMENT STABILIZED LASER ARRAY

(71) Applicant: The Board of Trustees of the University of Illinois, Urbana, IL (US)

(72) Inventors: Jose A. Rivera, Savoy, IL (US); Austin Steinforth, Urbana, IL (US); J. Gary Eden, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 16/127,840

(22) Filed: Sep. 11, 2018

(65) Prior Publication Data
US 2019/0094564 A1    Mar. 28, 2019

Related U.S. Application Data

(63) Continuation-in-part of application No. 15/778,535, filed as application No. PCT/US2016/063116 on Nov. 21, 2016.
(Continued)

(51) Int. Cl.
*G02B 27/48* (2006.01)
*H01S 3/063* (2006.01)
(Continued)

(52) U.S. Cl.
CPC ............ *G02B 27/48* (2013.01); *G02F 1/355* (2013.01); *H01S 3/0604* (2013.01);
(Continued)

(58) Field of Classification Search
CPC .... H01S 3/0604; H01S 3/0627; H01S 3/0635; H01S 3/08031; H01S 3/08045;
(Continued)

(56) References Cited

U.S. PATENT DOCUMENTS

| 4,803,688 A | 2/1989 | Lawandy |
| 4,986,635 A * | 1/1991 | Spry ...................... G02B 5/203 |
| | | 359/886 |

(Continued)

FOREIGN PATENT DOCUMENTS

| WO | 2008152367 A1 | 12/2008 |
| WO | 2017091508 A1 | 6/2017 |

OTHER PUBLICATIONS

Fleck et al., "Convective assembly of a particle monolayer", Langmuir, vol. 31, No. 51, pp. 13655-13663, 2015.
(Continued)

*Primary Examiner* — Armando Rodriguez
(74) *Attorney, Agent, or Firm* — Greer, Burns & Crain, Ltd.; Steven P. Fallon

(57) ABSTRACT

A light source for an imaging system. The light source includes a microresonator laser array having opposing mirrors arranged substantially parallel to one another. A laser gain medium is between the opposing mirrors. An array of microrefractive elements is arranged to stabilize the microresonator. A pump laser's output is shaped by a lens that directs it toward the micro-resonator laser array. An output lens directs a plurality of laser beams from the microresonator laser array to be incoherently combined at an object to be illuminated.

21 Claims, 37 Drawing Sheets

Related U.S. Application Data

(60) Provisional application No. 62/557,367, filed on Sep. 12, 2017, provisional application No. 62/259,451, filed on Nov. 24, 2015.

(51) Int. Cl.

| | | |
|---|---|---|
| *H01S 3/06* | (2006.01) | |
| *G02F 1/355* | (2006.01) | |
| *H01S 3/08* | (2006.01) | |
| *H01S 3/094* | (2006.01) | |
| *H01S 3/10* | (2006.01) | |
| *H01S 3/16* | (2006.01) | |
| *H01S 3/213* | (2006.01) | |
| *H01S 3/042* | (2006.01) | |
| *H01S 3/02* | (2006.01) | |
| *H01S 3/086* | (2006.01) | |
| *H01S 3/07* | (2006.01) | |

(52) U.S. Cl.
CPC .......... *H01S 3/0627* (2013.01); *H01S 3/0635* (2013.01); *H01S 3/08* (2013.01); *H01S 3/08031* (2013.01); *H01S 3/08045* (2013.01); *H01S 3/08059* (2013.01); *H01S 3/094038* (2013.01); *H01S 3/10092* (2013.01); *H01S 3/025* (2013.01); *H01S 3/042* (2013.01); *H01S 3/0612* (2013.01); *H01S 3/07* (2013.01); *H01S 3/0804* (2013.01); *H01S 3/086* (2013.01); *H01S 3/169* (2013.01); *H01S 3/1625* (2013.01); *H01S 3/1643* (2013.01); *H01S 3/213* (2013.01)

(58) Field of Classification Search
CPC .. H01S 3/094038; H01S 3/10092; H01S 3/23; H01S 3/1625; G02B 27/48; G02F 1/355
See application file for complete search history.

(56) References Cited

U.S. PATENT DOCUMENTS

| | | | | |
|---|---|---|---|---|
| 5,028,802 A | * | 7/1991 | Webb | ...................... H01S 5/423 |
| | | | | 250/235 |
| 5,265,116 A | * | 11/1993 | Mooradian | ........... H01S 3/0627 |
| | | | | 372/21 |
| 7,030,383 B2 | | 4/2006 | Babayoff et al. | |
| 7,339,148 B2 | | 3/2008 | Kawano et al. | |
| 7,630,416 B2 | * | 12/2009 | Hong | .................... H01S 3/0057 |
| | | | | 372/13 |
| 2011/0149285 A1 | | 6/2011 | Chen et al. | |
| 2013/0121363 A1 | | 5/2013 | Goldberg | |
| 2015/0064447 A1 | | 3/2015 | Dewa et al. | |

OTHER PUBLICATIONS

Giesen et al., "Scalable Concept for Diode-Pumped High-Power Solid-State Lasers", Applied Physics B, vol. 58, pp. 365-372, 1994.
Huignard et al., "Speckle-free imaging in four-wave mixing experiments with Bi12Si020 crystals", Opt. Letters, vol. 5, p. 436, 1980.
Kohler et al., "Speckle reduction in pulsed-laser photographs", Opt. Commun., vol. 12, No. 24, 1974.
Redding et al., "Low spatial coherence electrically pumped semiconductor laser for speckle-free full-field imaging", PNAS, vol. 112, No. 5, pp. 1304-1309, Feb. 3, 2015.
Redding et al., "Speckle-free laser imaging using random laser illumination", Nature Photonics, vol. 6, pp. 355-359, Apr. 29, 2012.
Voelkel et al., "Laser beam homogenizing: limitations and constraints", Proc. SPIE 7102, 71020J-1, 2008.
Shane Thomas, International Search Report for Application No. PCT/US2016/063116, dated Feb. 16, 2017.

* cited by examiner

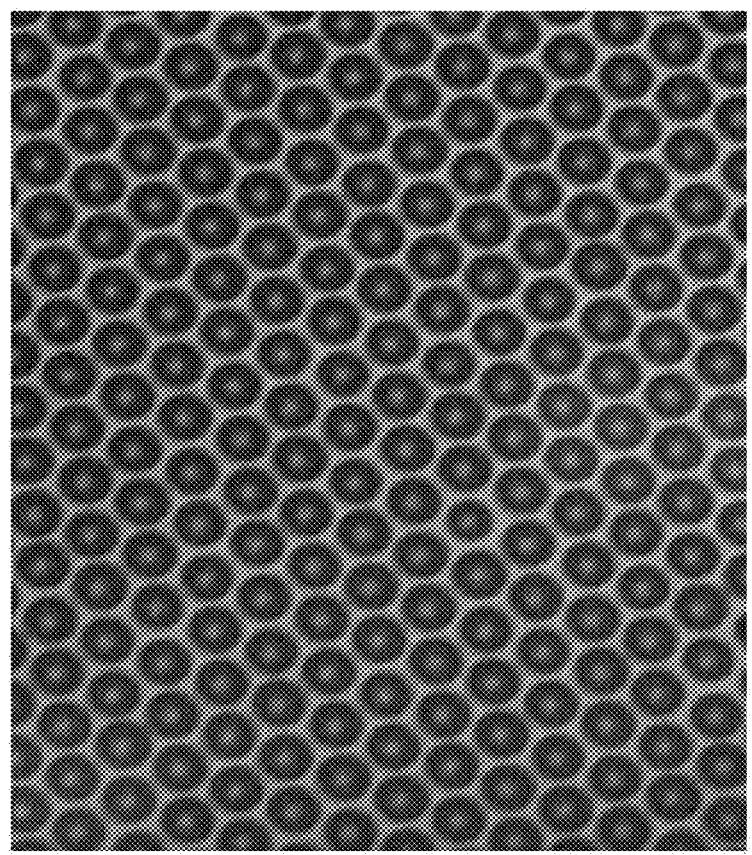
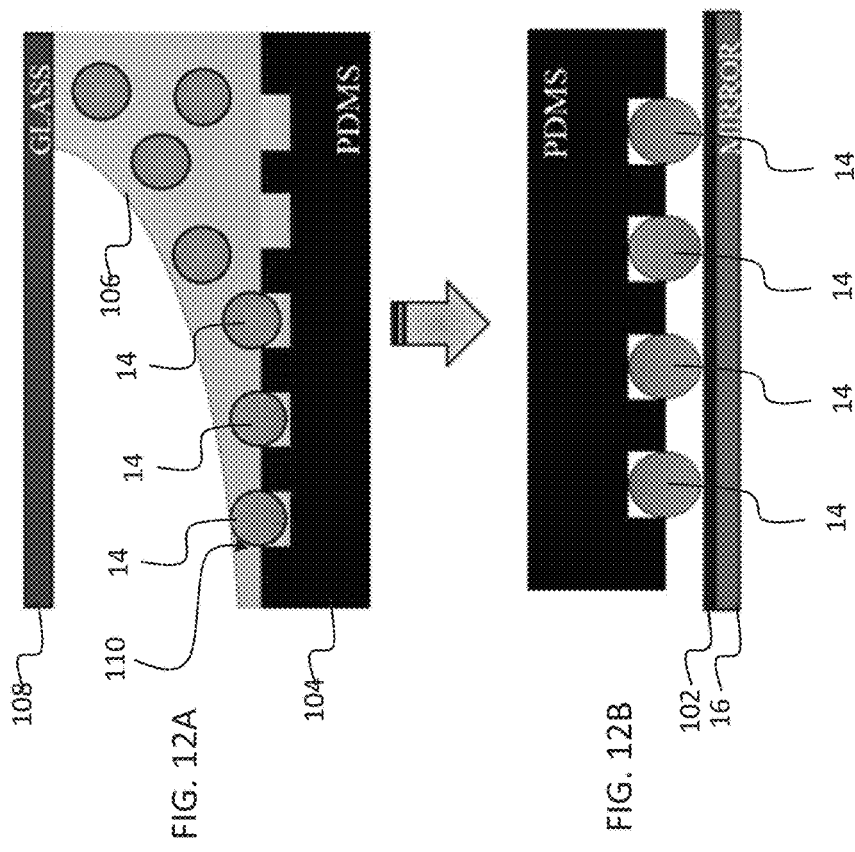
FIG. 12A  FIG. 12B  FIG. 12C

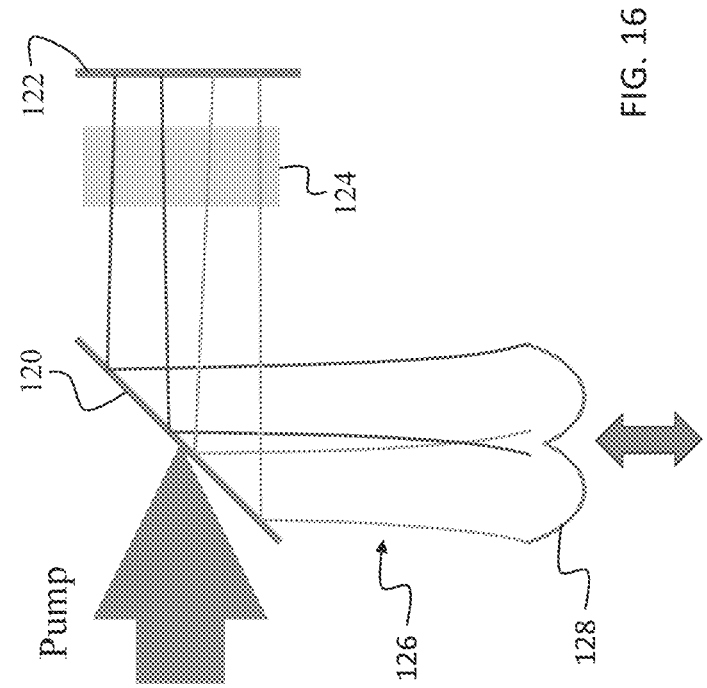

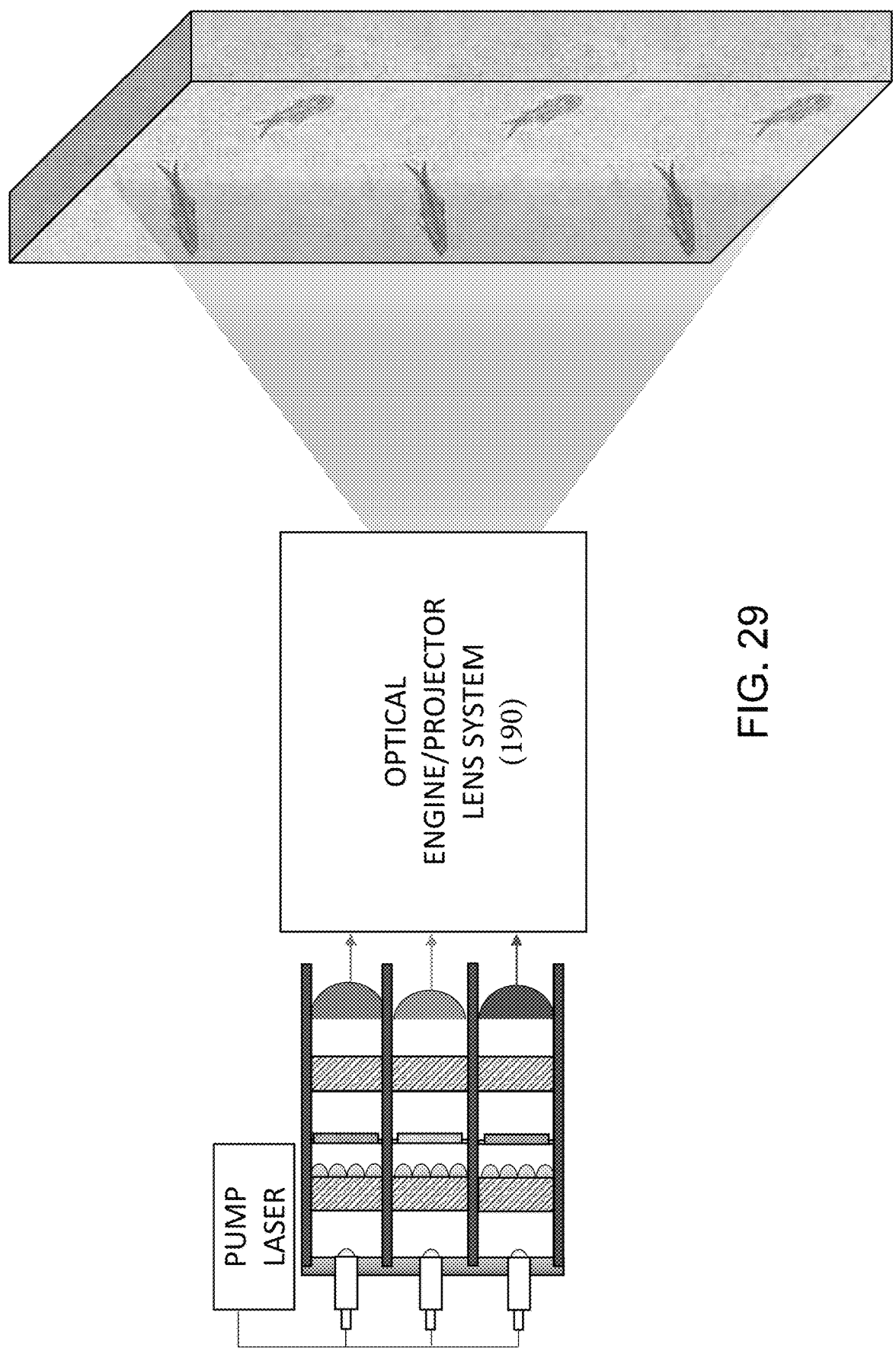

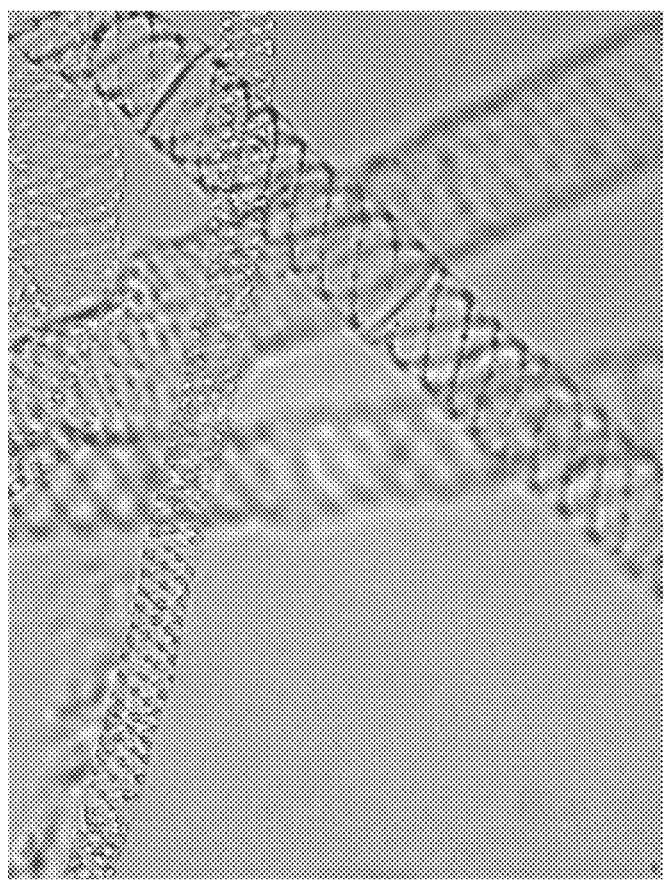
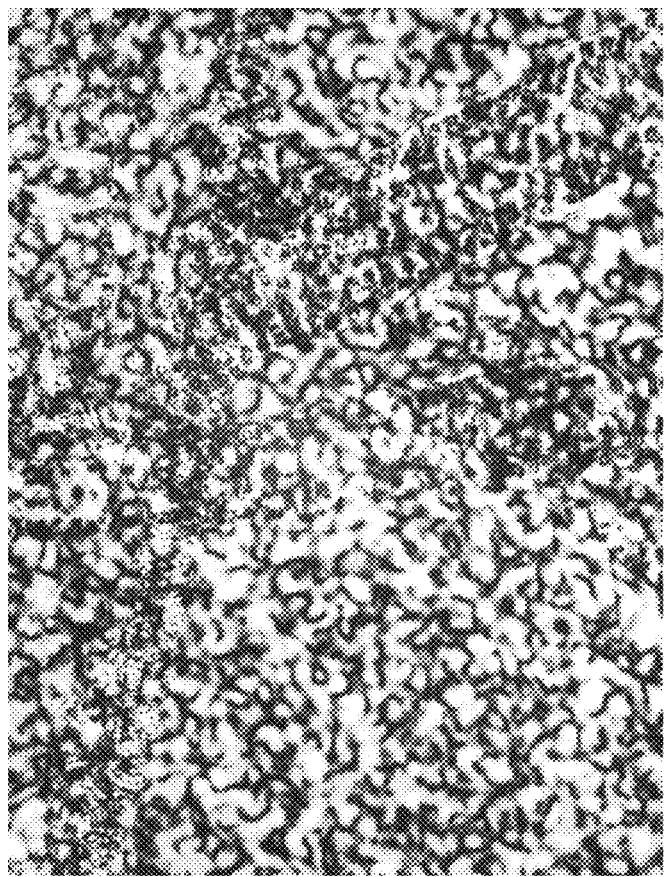
FIG. 32B
FIG. 32A

LOW-SPECKLE LIGHT SOURCE AND IMAGING DEVICES WITH MICRO-REFRACTIVE ELEMENT STABILIZED LASER ARRAY

PRIORITY CLAIM AND REFERENCE TO RELATED APPLICATION

The application claims priority under 35 U.S.C. § 119 and all applicable statutes and treaties from prior U.S. provisional application Ser. No. 62/557,367, which was filed Sep. 12, 2017. This application is also a continuation-in-part and claims priority under 35 U.S.C. § 120 and all applicable statutes and treaties from prior pending U.S. application Ser. No. 15/778,535, filed May 23, 2018, which application was a 35 U.S.C. 371 national phase application of PCT/US2016/063116, filed Nov. 21, 2016, which application claimed priory from U.S. Provisional Application 62/259,451, filed Nov. 24, 2015.

STATEMENT OF GOVERNMENT INTEREST

This invention was made with government support under grant number FA9550-14-1-0002 awarded by the U.S. Air Force Office of Scientific Research. The government has certain rights in the invention.

FIELD

Fields of the invention include imaging, microscopy, light sources, displays, optical resonators and lasers. Example applications of the invention include clinical diagnostic microscopes, imaging LIDAR, confocal microscopes, optical coherence tomography, quantitative phase imaging, and laser-based displays, e.g., laser projectors.

BACKGROUND

It is well known that speckle limits the contrast and resolution of images obtained when a laser is used as a light source in a high-resolution imaging system, such as in clinical diagnostic microscopes and confocal microscopes.

Most attempts to reduce the impact of laser speckle on microscopy have involved continuous-wave (CW) laser sources, and a movable optical component, such as a rotating diffuser. This approach does not eliminate speckle but instead reduces the intensity variations characteristic of speckle in an image by averaging the variations over long timescales (typically milliseconds or more). One disadvantage to the rotating diffuser (and other movable components) is that moving parts are required in the imaging system. Consequently, the integration times required to obtain an acceptable image must be sufficiently long to reduce intensity variations to a desired level. Therefore, this approach is incapable of imaging objects on a time scale that is less than the required averaging time. This is a serious liability if one wishes to image cells and other organisms that move or change shape with time. Another clear difficulty of incorporating movable components into a system is that such mechanical mechanisms adversely impact cost and the reliability of the imaging system.

A vibrating fiber represents one conventional approach that requires moving parts and a similar integration time. See, R. Voelkel, K. J. Weible, "Laser beam homogenizing: limitations and constraints" Proc. SPIE 7102, 71020J-1 (2008). This technique also creates difficulties for the design of the light source and its associated optics because coupling light into a fiber requires precision alignment.

Other approaches to reducing speckle include chaotic cavities and random lasers. See, respectively, B. Redding et al. "Low spatial coherence electrically pumped semiconductor laser for speckle-free full-field imaging," PNAS 112, 1304 (2015); B. Redding et al., "Speckle-free laser imaging using random laser illumination," Nature Photonics 6, 355 (2012). These two types of sources often suffer from low light-collection efficiencies and high divergence of the emitted optical radiation because of the random nature of the lasers. Furthermore, random lasers are known to produce different emission spectra from shot-to-shot.

Still other approaches include passing the beam through nonlinear media and multi-mode optical fibers with a complex optical arrangement to reduce the spatial and temporal coherence of the light. See, D. Kohler, et al. Speckle reduction in pulsed-laser photographs. Opt. Commun. 12, 24 (1974); J. P. Huignard et al., "Speckle-free imaging in four-wave mixing experiments with $Bi_{12}SiO_{20}$ crystals. Opt. Lett. 5, 436 (1980). While somewhat effective when narrowband light is not required, the complex optical designs are costly and present other alignment problems. These sources are also difficult to integrate into the compact package required by various high-resolution imaging systems and microscope-based imaging systems, in particular.

Arrays of continuous wave, vertical cavity surface-emitting lasers (VCSELs) have also been utilized to reduce speckle. However, VCSELs suffer from high diffraction losses, as well as limited bandwidth (owing to the cavity size), a limited selection of array geometries, and a limited selection of available gain media.

Because of these drawbacks to the use of conventional lasers, state-of-the-art clinical microscopy systems often rely upon incoherent light sources such as LEDs. Standard lamps and LED light sources provide comparatively low intensity but are frequently employed in place of lasers to avoid the difficulties associated with speckle. In addition to having severely restricted intensities, conventional lamps and LEDs generally provide CW (rather than pulsed) light and are, therefore, unsuitable for capturing images on a short timescale.

U.S. Pat. No. 7,339,148 to Kawano et al. discloses a confocal microscope that can use a laser light source, and lamps such as xenon or halogen lamps. The laser light or other illumination light is modulated by a digital mirror array. The laser light source can include a plurality of lasers having differing wavelengths, but this microscope requires spatial scanning of the illumination light with a galvanometer-driven mirror. In operation, the micromirrors scan a laser spot over the sample. This allows the computer to construct the image point-by-point as the micromirrors scan the beam. When the microscope is operated in reflectance mode (for imaging "label-free" samples that have no dye in them to generate fluorescence), there will be speckle.

U.S. Pat. No. 7,030,383 to Babayoff et al. describes a confocal imaging apparatus incorporating a laser, and capable of imaging specimens that are not flat. This apparatus also requires an optical component in the system (an imaging optic) to be movable in order for the speckle produced by the laser to be reduced.

SUMMARY OF THE INVENTION

A preferred embodiment provides a light source for an imaging system. The light source includes a microresonator having opposing mirrors arranged substantially parallel to one another. A laser gain medium is situated between the opposing mirrors. An array of microrefractive elements is arranged within the resonator so as to stabilize the resonator and produce a microlaser beam for each microrefractive element in the array. The beam from a pump laser is shaped by a lens that may also direct the pump laser toward the microresonator.

An optical microresonator includes opposing mirrors arranged substantially parallel to each other and separated to confine reflections therebetween. An array of microrefractive elements is arranged to stabilize the resonator. The microresonator includes a gain medium to generate and amplify light as it is reflected between the mirrors. A lens shapes the pump laser beam and directs it toward the microresonator to generate output laser light because the resonator is stabilized by the array of microrefractive elements.

BRIEF DESCRIPTION OF THE DRAWINGS

FIG. 5A with a polystyrene sphere having a diameter of 75 µm; FIG. 5B: transverse modes for an 80 µm diameter sphere;

FIGS. 12A-12B illustrate a preferred fabrication process for a resonator and laser of the invention, and FIG. 12C is an image of an array of microspheres in a hexagonal (close-packed) pattern formed on a resonator mirror in accordance with the method of FIGS. 12A-12B;

FIG. 16 illustrates an arrangement, alternative to that of FIG. 11, for controlling the phase of individual microsphere lasers by employing a spatial light modulator;

FIG. 29 illustrates a preferred embodiment laser projector;

FIGS. 32A and 32B compare the image of a sample obtained with the green line (543 nm) of a helium-neon, continuous-wave (CW) laser through a diffuser to the same sample illuminated through a diffuser by an experimental near-infrared laser array containing several hundred microlaser beams;

DETAILED DESCRIPTION OF THE PREFERRED EMBODIMENTS

Figure 1A:
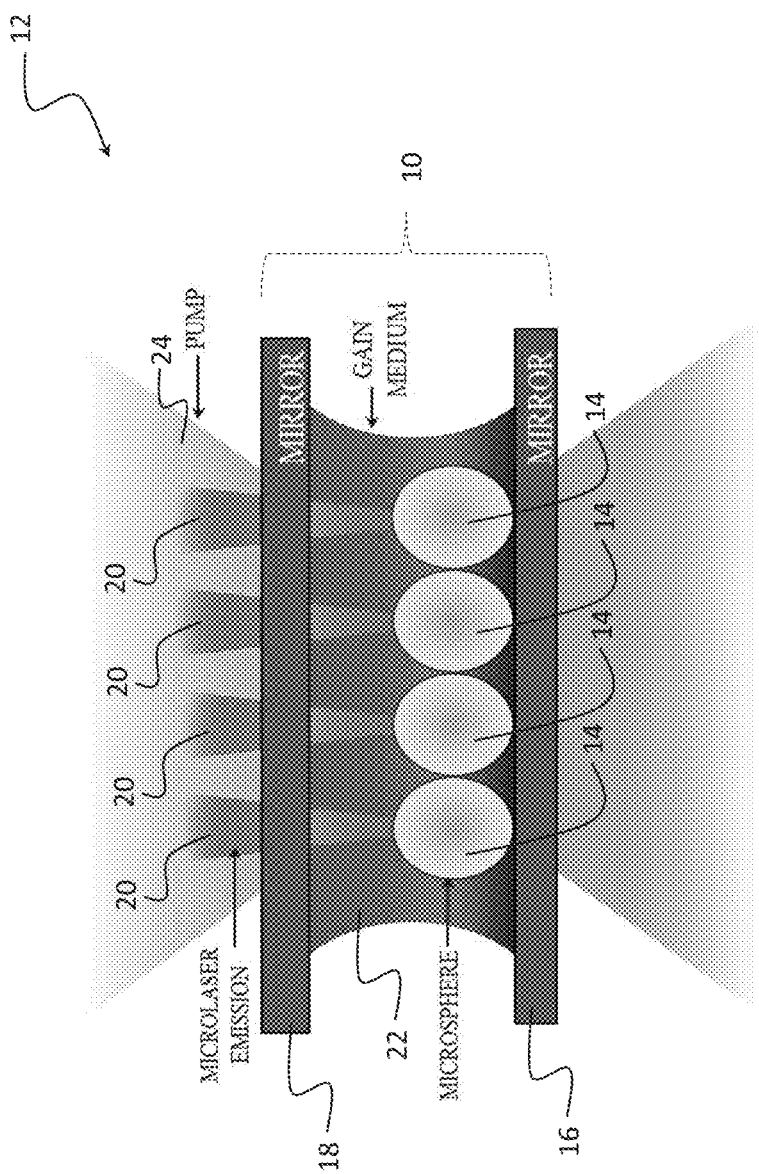
FIG. 1A is a schematic diagram (in cross-section) of a preferred embodiment resonator and laser of the invention with a liquid or gas gain medium.

Low-speckle, imaging light sources of the invention are flexible in terms of array geometry (limited only by the geometries achievable with the microrefractive elements utilized, e.g., microlens arrays or microspheres, including layered structures), and can be used with most common gain media, including external-cavity VCSELs (i.e., VECSELs), if desired. The ability to use a variety of gain media is especially important when certain wavelengths or material properties are desired. For example, experimental and commercial laser light sources have used titanium-doped sapphire as a gain medium. This gain medium has an enormous bandwidth (more than 200 nm) which is beneficial for certain biological imaging applications.

A preferred light source of the invention can be incorporated into a microscope system, such as a confocal microscope system. The light source includes a pump laser and a lens that shapes the pump laser radiation and directs it toward a microresonator. The microresonator includes opposing mirrors arranged substantially parallel to each other and separated so as to accommodate the gain medium and satisfy the resonator stability criterion for a given microsphere diameter. Microrefractive elements (tens, hundreds, thousands, millions or more) stabilize the resonator and act as a microlens array. An output lens directs a plurality of microlaser beams toward the object to be imaged. Because the phases of the individual microlaser beams vary randomly with respect to each other, these beams combine incoherently as they approach the object. Because the laser light reaching the object is the incoherent sum of the individual microbeams, the random variations of the phase (in time) of each of the microbeams are cancelled as the microbeams combine. Consequently, a laser beam having phase properties similar to those of a completely incoherent light source is produced by the summation of hundreds or thousands of microlaser beams. The result is that speckle is virtually eliminated while retaining the ability of the laser to be pulsed and capture images of short duration. That is, the availability of short laser pulses (i.e., femtoseconds to milliseconds) having low optical coherence permits the acquisition of dynamic (time-varying) information, also on short time scales, while maintaining or increasing the level of contrast in the image. In preferred embodiments, the gain medium is a titanium-doped sapphire crystal, Nd:YAG, Yb:glass, or other solid state material.

Preferred embodiment light sources are configured to replace (retrofit) an existing light source in a microscopy system such as a clinical diagnostic microscope. The light source is contained in a sealed enclosure that is configured and sized according to the existing light source of the microscopy system, such as in the shape of a cylinder. A connector cord extends from the sealed enclosure and connects to the microscope electronics, allowing for the miniature laser pumping the microbeam laser array to be powered by the existing electronics built into the microscope. Another preferred embodiment consists of the microbeam laser array also installed directly into the microscope. However, in this embodiment, an optical fiber extends from the rear portion of the microbeam laser cavity and connects to a laser pump source and its power supply. In this way, the pump laser and its power source can be located up to several meters from the microscope. Furthermore, with such an arrangement, one pump source can serve to pump several microbeam laser arrays located in separate microscopes.

The microlaser array is stabilized with microrefractive elements. In preferred embodiments, the microrefractive elements are located on one side of the cavity, preferably situated on or near one of the mirrors. If microrefractive elements are on both sides of the cavity, such as on both mirrors, then the microrefractive elements can be aligned opposite each other (one at each end of the resonator) or two distinct arrays of microlasers can be produced by intentionally misaligning the two sets of microspheres from each other. In preferred embodiments, substantially planar mirrors tolerate a misalignment from the perfect parallel requirement of conventional Fabry-Pérot resonators discussed in the background, but are stabilized by the microrefractive elements. In preferred embodiments, the microrefractive elements are micro spheres. In other embodiments, a biological cell or a sheet of spherical caps composed of glass or polymer are used as microrefractive elements. Properly sized refractive elements of many different materials can be used, as will be appreciated by artisans.

Stable beams are produced with lasing occurring at the positions of the microrefractive elements. The number of beams can be tens, hundreds, thousands or more, with each beam corresponding to the position of a microrefractive element, which can be arranged in a manner corresponding to pixels of a display. All of the microlaser beams are normally oriented so as to be parallel to the axis of the optical resonator (this occurs naturally when the mirrors are properly aligned) but the geometry of the microlaser array (viewed along the resonator axis) is arbitrary and defined solely by the positions of the microrefractive elements on or near the mirror.

Each laser beam can be of high optical quality, having a transverse intensity profile of the lowest order mode. The present resonators can be configured to generate laser beams whose properties can be controlled with precision. A system of the invention can assemble these beams (once they emerge from the laser) into one or more beams of higher power. Preferred systems assemble a single (or a few) laser beam from hundreds to thousands of smaller beams for which the optical quality (mode pattern, phase relative to other beams, etc.) can be controlled with exquisite precision.

Preferred embodiments of the invention will now be discussed with respect to the drawings. The drawings may include schematic representations, which will be understood by artisans in view of the general knowledge in the art and the description that follows. Features may be exaggerated in the drawings for emphasis, and features may not be to scale.

Before describing preferred embodiment light sources, imaging systems, and other preferred devices, details concerning preferred embodiments of microlaser arrays will first be presented.

FIG. 1A is a schematic diagram illustrating a preferred resonator 10 and laser 12 of the invention. One or more microrefractive elements 14, e.g., microspheres, are located on the reflecting surface of a flat (first) planar mirror 16, and a second planar mirror 18 is positioned opposite the first mirror 16 and is oriented so as to be substantially parallel to the first mirror, but need not meet the strict requirements of the alignment of prior resonators (such as a Fabry-Pérot resonator) discussed in the background. Permissible deviations of the resonator mirrors from being perfectly parallel are implementation dependent, but the use of microrefractive elements and high gain laser media in the optical cavity creates a system that can tolerate several degrees from parallel, e.g. as much as 7 degrees away from parallel. In a practical realization, the size and separation of the mirrors will limit the amount of deviation from parallel that is allowable. For example, in experiments conducted at the University of Illinois, misalignment of the mirrors by more than approximately 0.1 degrees would lead to the two mirrors striking one another when one is attempting to separate them by the correct distance. Larger separations or smaller mirrors can tolerate larger misalignments from parallel. Prior systems that require parallel mirror alignment often fail to lase with even 1-2 seconds of arc of misalignment, where 1 second of arc is 0.000277778 degrees. The important point is that the microsphere refractive elements stabilize the system such that the mirrors do not require such precise alignment which, therefore, permits liberal manufacturing tolerances as compared to prior devices.

The microsphere refractive elements 14 stabilize the resonator 10 and a laser beam 20 is generated at each microsphere position when the resonator is illuminated by a pump laser beam 24. Each microsphere 14 either simply rests on its mirror or is attached to it by any one of a variety of material films Many commercially available transparent adhesives are suitable for this purpose. Example experimental devices used an optically clear adhesive tape sold by Thorlabs. A gain medium 22 between the mirrors provides the optical gain required for lasing. Lasing is induced with an optical pump 24. Example gas or vapor media include metal vapors and several of the rare gases. Exemplary liquid media include organic dyes as well as colloidal quantum dots in solution.

Figure 1B:
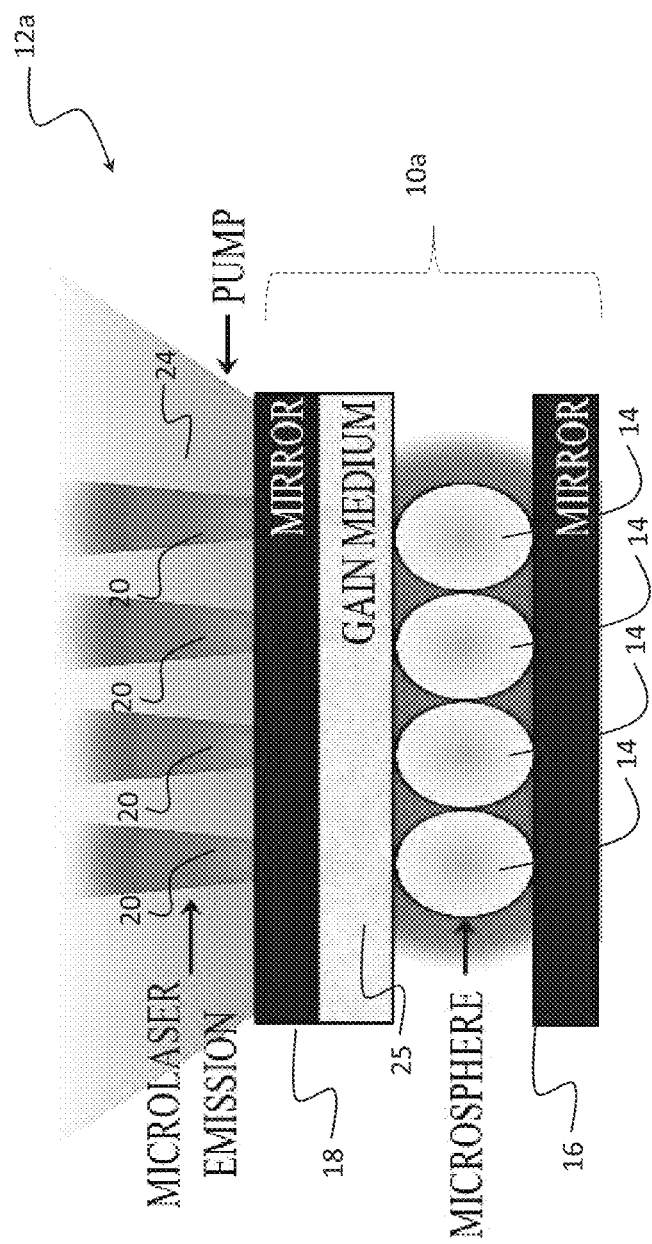
FIG. 1B is a schematic diagram (in cross-section) of a preferred embodiment resonator and laser of the invention based upon FIG. 1A with a solid gain medium.
Figure 1C:
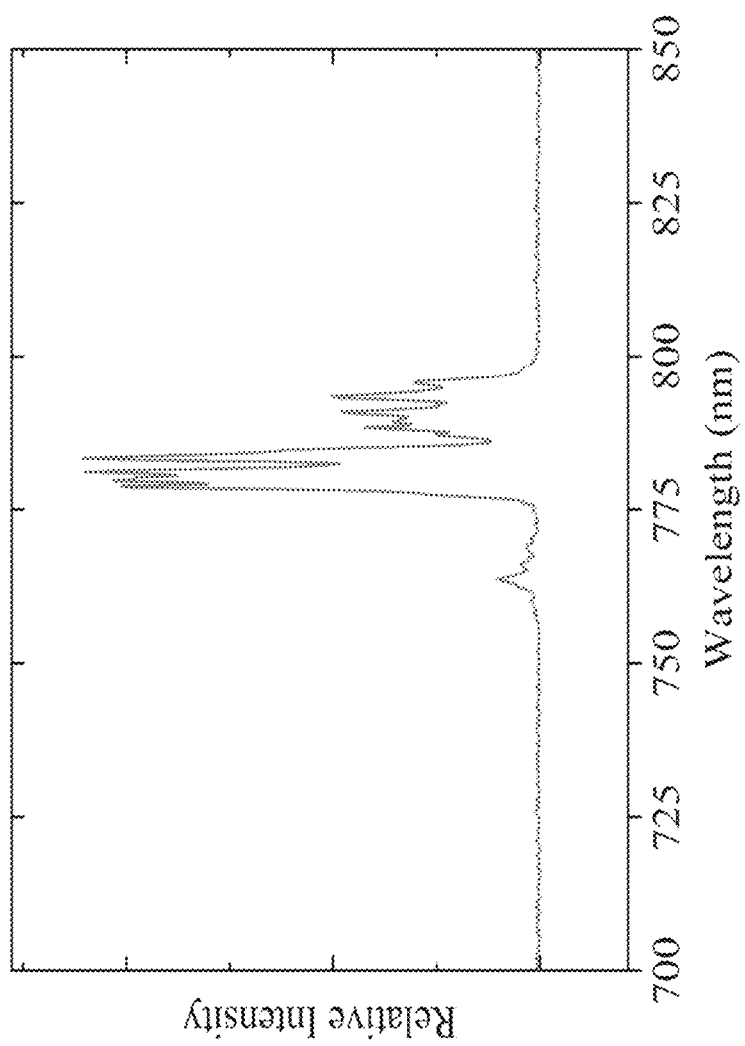
FIG. 1C are spectra from a solid gain medium laser in accordance with FIG. 1B.

FIG. 1B shows a similar preferred resonator 10a and laser 12a of the invention. The resonator 10a and laser 12a are based upon the resonator 10 and laser 12 of FIG. 1A, but use a solid gain medium 25 instead of the liquid or gas medium 22 of FIG. 1A. The solid gain medium 25 contacts the microspheres and the mirror 18 in this embodiment. The FIG. 1B embodiment has been tested, and a lasing spectrum of the solid-state gain medium (Ti:Al$_2$O$_3$) is shown in FIG. 1C. Solid-state gain media as in FIG. 1B are preferred for incorporating the resonators, and lasers, of the invention into existing high power laser systems. The wavelength of the pump and the microlasers, as well as the efficiency and output power of the microlasers, will depend on the gain medium. Generally, the pump wavelength is selected to match at least one of the absorption features (lines or bands) of the gain medium being used. In an example experimental device consistent with FIG. 1A with a liquid colloidal quantum dot gain medium, mirrors that transmit ~94% of the pump light and reflect >99.99% of the output laser emission were employed. The example device was pumped with a pulsed, frequency-doubled Nd:YAG laser (532 nm; ~8 ns pulse duration). Nd:YAG is also an example solid medium that could be used as a gain medium in embodiments of the present invention. Another exemplary solid-state medium is Yb:YAG. Chromium-doped forsterite is another example. The device can also be operated in continuous (CW) mode.

The FIG. 1A laser and resonator have been demonstrated experimentally with a liquid colloidal quantum dot gain medium. In example experimental devices, microsphere refractive elements were fabricated from polystyrene and had diameters of 10-200 μm (micrometers) but both smaller and larger diameters are also acceptable. Depending upon the separation between the mirrors and the diameter and transverse mode that are desired for the resulting laser beam, calculations based upon those used to generate FIG. 2 (ABCD matrix theory calculations) will determine the diameter required for the sphere(s). The material from which the microspheres are fabricated can be chosen from a wide range of solids (and liquids and gases inside solid shells (e.g. commercially available Rhodamine or LDS laser dyes)), including sapphire, glass, diamond, and infrared transmitting materials such as Si and ZnSe. Other embodiments use a biological cell as a lens. Furthermore, the refracting element need not be a microsphere but could also be a sheet of spherical caps composed of glass or polymer, for example, or micro-GRIN (graded refractive index) lenses. Practically any refracting element can be used, subject to the physical size constraints of the resonator. The index of refraction of the microrefracting element is generally greater than that of the surrounding medium, which in FIG. 1A is the gain medium in the cavity between the mirrors 16 and 18. The focal length of the microrefracting element and mirror separation are chosen so as to make the cavity stable. In the example case of polystyrene surrounded by water, the range of stability is between D and 2D, where D is the diameter of each sphere.

The specific gain medium chosen for most of the example experiments to demonstrate the invention was a liquid comprising colloidal quantum dots in a solvent. The gain medium may also be a solid or a gas. In an example experimental embodiment consistent with FIG. 1B, a resonator/Ti:sapphire gain medium system is pumped optically and lasing occurs only at positions that are defined by the locations of the spheres on the mirror, as well as the diameter of the spheres and the mirror separation.

The resonator 10 of FIG. 1A has been analyzed with an ABCD ray matrix formalism to determine how the beam propagates through the cavity. Example calculations presumed a microsphere diameter of 80 μm, and the beam diameter is predicted to be approximately 3 μm for cavity lengths up to 120 μm. For larger cavity lengths, the spot size rises rapidly.

Figure 2:
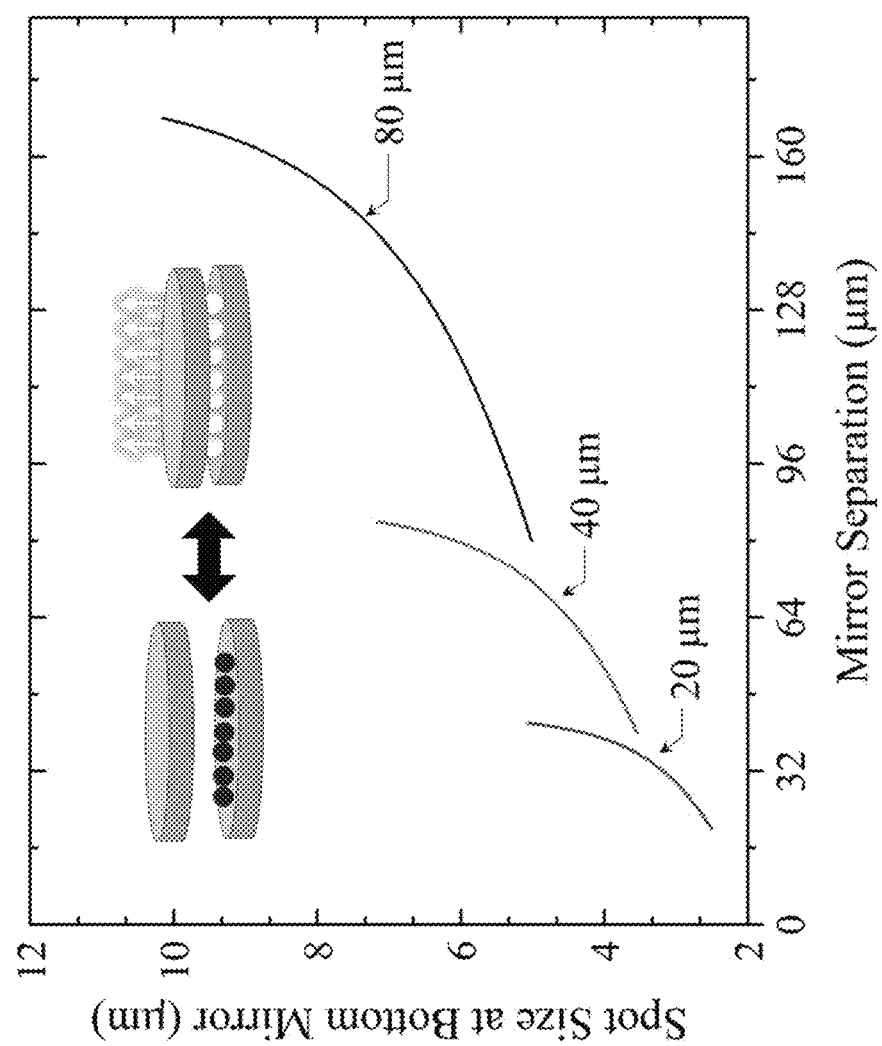
FIG. 2 are data representing calculations, based upon a liquid gain medium, showing the relationship between microsphere size, laser spot size at the bottom mirror, and mirror separation, also indicating the range of mirror separations permissible for lasing to occur with the preferred embodiments in FIG. 1A.

FIG. 2 includes simulated data showing the relationship of microsphere size, laser spot size at the bottom mirror, and mirror separation, also indicating the range of separations permissible for lasing. The three curves are for different sphere sizes of 20 μm, 40 μm, and 80 μm. The permissible mirror separations (cavity length) for the 20 μm microspheres ranged from ~21 μm to 46 μm. The permissible mirror separations (cavity length) for the 40 μm microspheres ranged from ~41 μm to 80 μm. The permissible mirror separations (cavity length) for the 80 μm microspheres ranged from ~81 μm to 170 μm.

Figure 3:
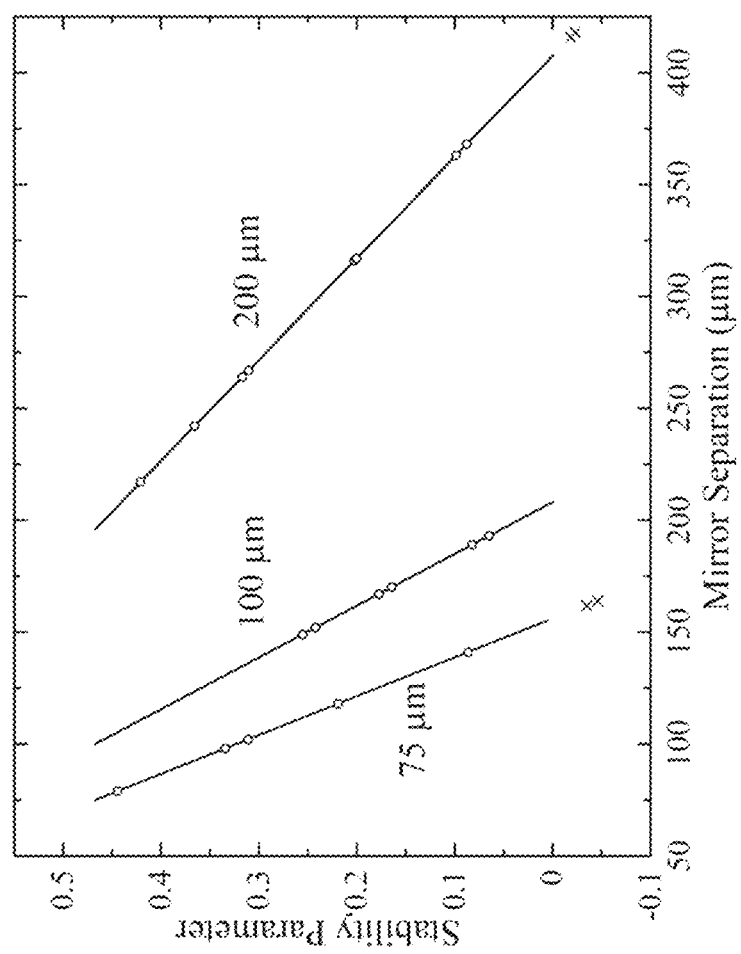
FIG. 3 plots data from calculations and experiments regarding the stability of the resonator of FIG. 1A.

FIG. 3 shows the results of both calculations and experiments to explore the stability of the resonator of FIG. 1. The solid lines represent the region of stability for a micro sphere of a given diameter while varying L over the indicated range. Experimental points indicate whether lasing was obtained ("o") or not ("x"). The three lines in FIG. 3 correspond to different values of the microsphere diameter: 75 μm, 100 μm, and 200 μm. The lines themselves indicate the region in mirror spacing over which a given sphere of a specific diameter will yield a stable cavity. It is clear from FIG. 3 that the experiments are in excellent agreement with theory. Specifically, experiments conducted anywhere along any of the three solid lines yielded a laser. However, no lasing was observed if the experiments ventured off any of the lines.

Figure 4:
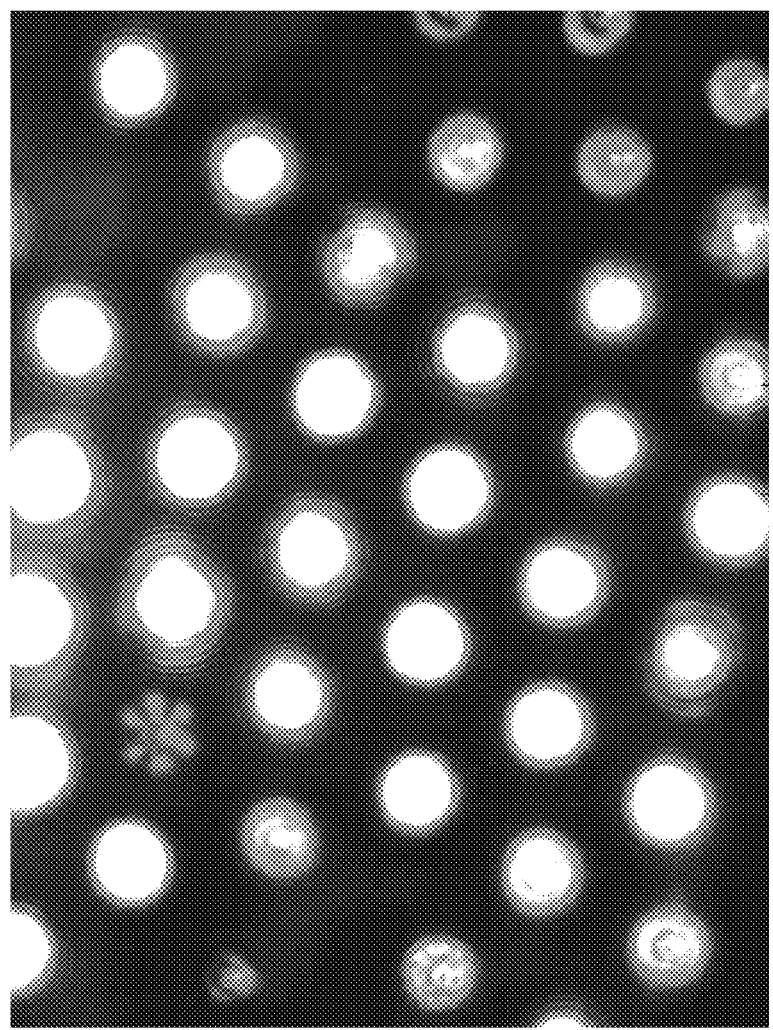
FIG. 4 is an optical micrograph of a portion of an experimental system of FIG. 1A with a liquid colloidal quantum dot gain medium in which several spheres are lying on the surface of a mirror.

FIG. 4 is a photograph (acquired with a microscope and a CCD camera) showing lasing from an example experimental system in accordance with FIG. 1. Several microspheres, 10 µm in diameter, had been placed onto the surface of the lower mirror. FIG. 4 shows that lasing is not occurring anywhere on the surface of the mirror except at those locations occupied by a microsphere. The microlaser beams produced from each of the microspheres are coming out of the page and are smaller in diameter than the associated microsphere itself. Thus, lasing is occurring only at positions of the mirror surface occupied by a microsphere. Lasing is evident by the bright spot within each sphere, and each of these microlaser beams is emerging from the resonator (out of the page).

Figure 5B:
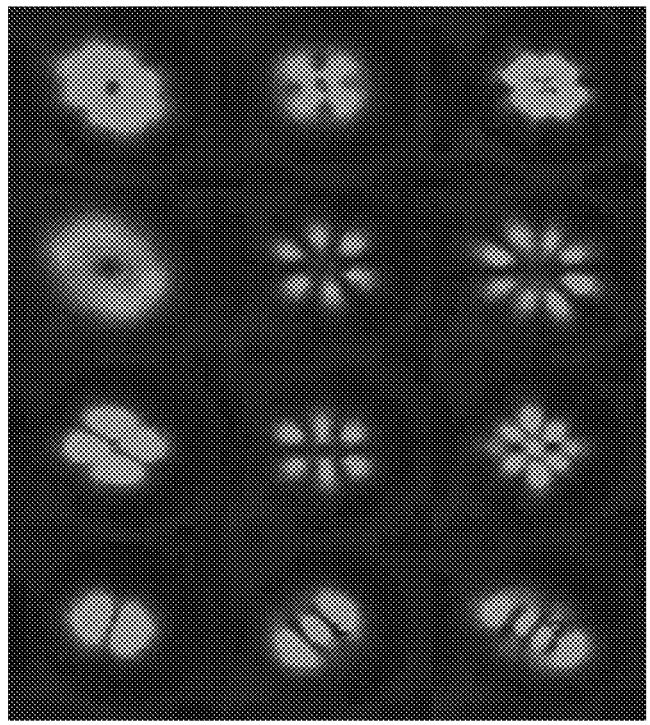
FIGS. 5A and 5B each include a series of optical micrographs showing the transverse modes of the laser beam produced by the experimental embodiment according to FIG. 1A.
Figure 5A:
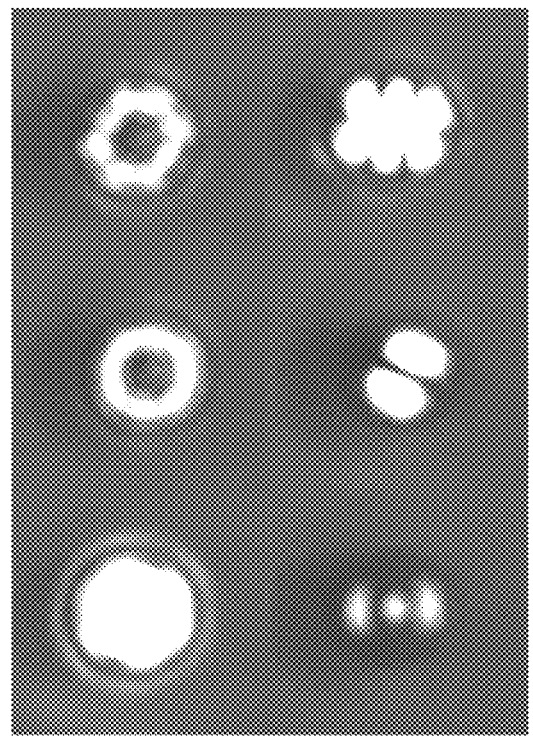

Resonators of the invention provide not only spatial selectivity in the realization of lasing within the resonator, as well as a set of parallel laser beams emerging from the resonator, but also provide control over the spatial properties of the laser radiation produced (i.e., the laser mode). When the microspheres are large (typically more than 100 µm), many transverse modes are observed in the laser output associated with a single sphere, and the mode switches frequently from one transverse mode to another. Consider, for example, FIGS. 5A and 5B which comprise a series of photographs of a single polystyrene sphere in a laser system consistent with FIG. 1B. The diameter of the sphere is 75 µm and the photographs show a few of the optical modes that one sees from a sphere of this size. The ring at upper left is a superposition of several transverse modes but single modes ($TEM_{12}$, $TEM_{10}$, and $TEM_{02}$) appear in the images in the lower row. Notice, for example, that the well-known $TEM_{10}$ and $TEM_{02}$ modes are observed in the two left-hand images on the lower row of FIG. 5A. For some applications of this technology, higher order transverse modes will be acceptable, but other applications will require that only the lowest order spatial (transverse) modes be generated. Experiments conducted with 10-75 µm diameter spheres have found that, by simply reducing the sphere diameter, the laser mode can be forced to be $TEM_{00}$ (the lowest order mode, whose beam is circular). Taking into account the refractive index of the gain medium, single-mode operation occurs near the upper edge of stability (see FIG. 2; for example, single-mode operation for an 80 µm microsphere would occur at a mirror separation close to ~159 µm). The microsphere size can also be reduced to achieve single mode operation. With reference to FIG. 2, a resonator with a 20 µm sphere is stable over a small range of mirror separations (~21-40 µm).

The experiments have demonstrated that the system of FIG. 1 will generate an array of laser beams, all of which are parallel and have a spot size (beam width) that is determined by the sphere diameter and the mirror separation. The individual beams are of high optical quality and can be intentionally combined after they have left the laser, or one can simply rely upon diffraction to combine the closely-packed microbeams. Furthermore, the number of laser beams can be in the tens of thousands or even millions. Convective assembly is a technique that can produce such numbers of microrefractive elements in a desired arrangement. See, e.g., Fleck et al., "Convective Assembly of a Particle Monolayer," Langmuir, 2015, 31 (51), pp 13655-13663.

An alternate embodiment is based upon two-dimensional photonic crystals of close-packed microspheres on the surface of one mirror. With this arrangement, a single resonator of modest size (2.5-5.0 cm (1"-2") diameter mirrors) is expected to produce at least hundreds of thousands of laser beams that are virtually identical and separated by only a few micrometers to less than 20 µm. The number of beams produced is limited only by the size of the microspheres and the total surface area available.

A single beam can be obtained solely by allowing the multiplicity of beams to diffract, which occurs naturally at sufficient distance as beams overlap, or can be achieved with a lens. In addition, the embodiment of FIG. 1 allows for one to engineer the specifications of the single beam that is formed by the combination of beams produced within the resonator. For example, the microspheres located on the surface of the lower mirror can be of two (or more) specific diameters and arranged on the mirror surface in the form of two interlaced arrays of spheres. The larger spheres will generally produce a beam of larger spot size and the mode will not (in general) be of the lowest order. However, the smaller spheres could, for example, be chosen to support only the lowest order mode. Through such "beam engineering" facilitated by careful choice of the geometric distribution of spheres and their size, laser beams having characteristics not available with conventional lasers and resonators will be attainable.

Applications for resonators and lasers of the invention are numerous. One example application improves the performance of a family of lasers known as disk lasers. Disk lasers have a thin, rare earth-doped glass or crystalline disk as the gain medium. See, A. Giesen, "Scalable concept for diode-pumped high-power solid-state lasers," (Appl. Phys. B, vol. 58, 365 (1994)). Disk lasers have been shown to generate laser powers beyond ten kilowatts. However, heating of the laser medium by the pump source has a severely adverse impact on the beam quality. While disk lasers can satisfy high-power requirements, these lasers are limited to applications such as welding, where beam quality is not critical. The $M^2$ parameter describes the beam quality in terms of the fundamental (highest quality) mode for which $M^2=1$, and increasing values of $M^2$ represent a degradation in beam quality. For many commercially available disk lasers, this value ranges from $M^2$~6 to 25 (depending on the power of the laser).

Figure 6:
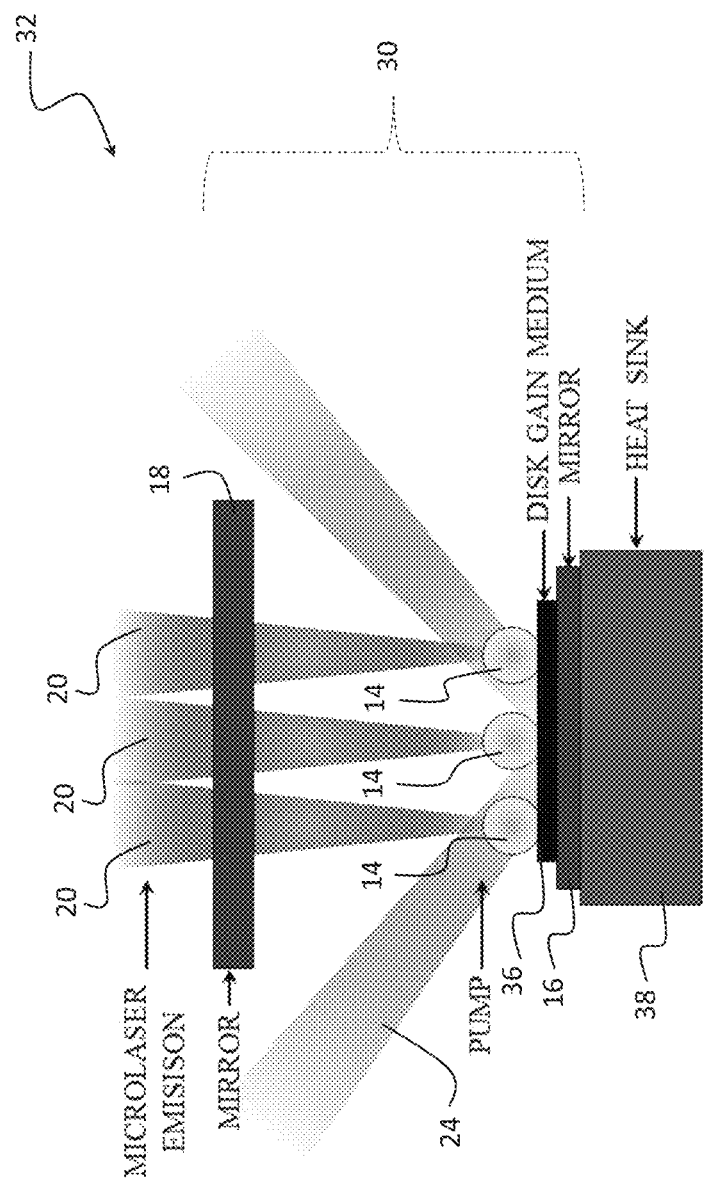
FIG. 6 is a schematic cross-sectional diagram of a variation of the FIG. 1A preferred embodiment, including a thin disk gain medium.

FIG. 6 shows a preferred resonator 30 and disk laser 32 constructed in accordance with the invention. The resonator 30 includes many features that are common with the resonator 10 of FIG. 1, and such features are labelled with common reference numbers. In the disk laser 32, the gain medium is a rare earth-doped disk 36 (as in Giesen) and the pump laser beam 24 enters from an angle to the disk 36. A heat sink 38 cools the system. The laser 32 permits: 1) an increased rate of cooling of the lasing regions in the disk 36, and 2) control of the mode quality of the individual beams 20, thereby improving the quality of the overall beam produced by the laser 32. The pump source 24 is schematically represented for the purpose of clarity, but in practice preferably fully illuminates all of the microspheres 14. In the resonator 30 and the laser 32, the microspheres 14 are situated upon the disk 36 and the mirror 16 is a thin mirror positioned between the heat sink 38 and the rare earth-doped disk 36. The mirror should be thinner than the beam diameter, and is preferably in the range of ~0.1-1 mm. The thin mirror allows heat to penetrate through the mirror to the heat sink. Lasing will occur only where the microspheres 14 are located and, therefore, heat generated in the lasing regions will quickly diffuse into adjacent, non-pumped, areas of the disk gain medium 36.

Figure 7:
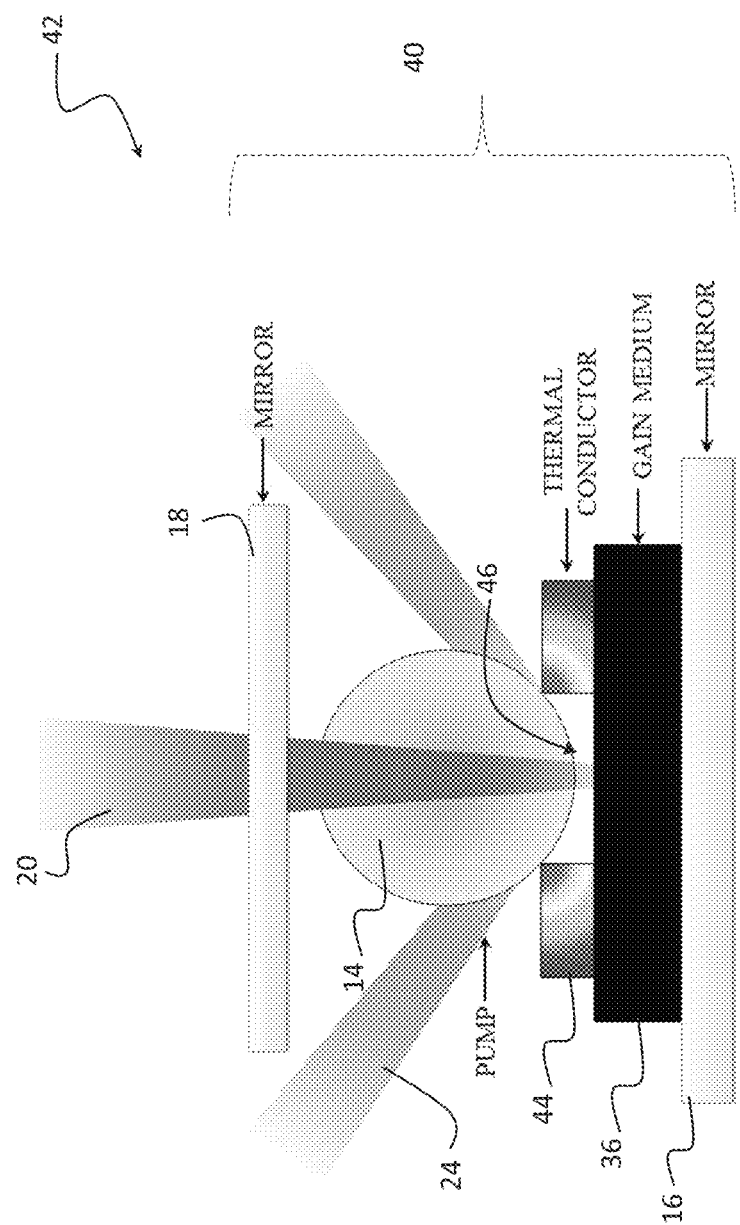
FIG. 7 is a schematic cross-sectional diagram of a variation of the FIG. 1A preferred embodiment, including a thermally-conducting grid.

FIG. 7 shows a preferred resonator 40 and disk laser 42 constructed in accordance with the invention, which is a variation of the FIG. 6 resonator 30 and disk laser 32. The resonator 40 includes many features that are common with the resonator 40 of FIG. 6, and such features are labelled with common reference numbers. In the resonator 40 and disk laser 42, the upper surface of the solid disk gain medium 36 includes a patterned thermal sink 44, which can be formed from a material of high thermal conductivity, such as diamond or copper, that will quickly conduct heat away from the regions of the gain medium 36 that are pumped and, therefore, heated. This patterned thermal sink 44 can be in the form of a film grid, and the spheres can be positioned within the openings 46 of the grid (which can be square, honeycomb, etc.). The microspheres 14 (only one is shown in the schematic diagram) rest in openings in the grid thermal sink 44, and the surfaces of the micro spheres 14 can be in contact with the surface of the mirror 16, or can be spaced away a predetermined distance from the surface of the mirror 16 that is controlled by the size of openings 46 and the size of the microspheres 14. The size of the microsphere(s) 14 can also be selected to be a predetermined size that ensures fundamental mode operation. The thermal properties of the grid heat removal system can be optimized by using materials that conduct heat efficiently, such as copper, diamond, and aluminum. Beam quality can thereby be sufficiently high for industrial and defense applications even at the power levels (1-30 kW average power and above) required by such applications. Additional applications include materials processing, and 3D laser printing (Stereolithography, for example), laser medicine (such as dermatological treatments and tattoo-removal). In scientific research, such arrays of microlasers can also be used to create complex optical traps and "tweezers".

Figure 8:
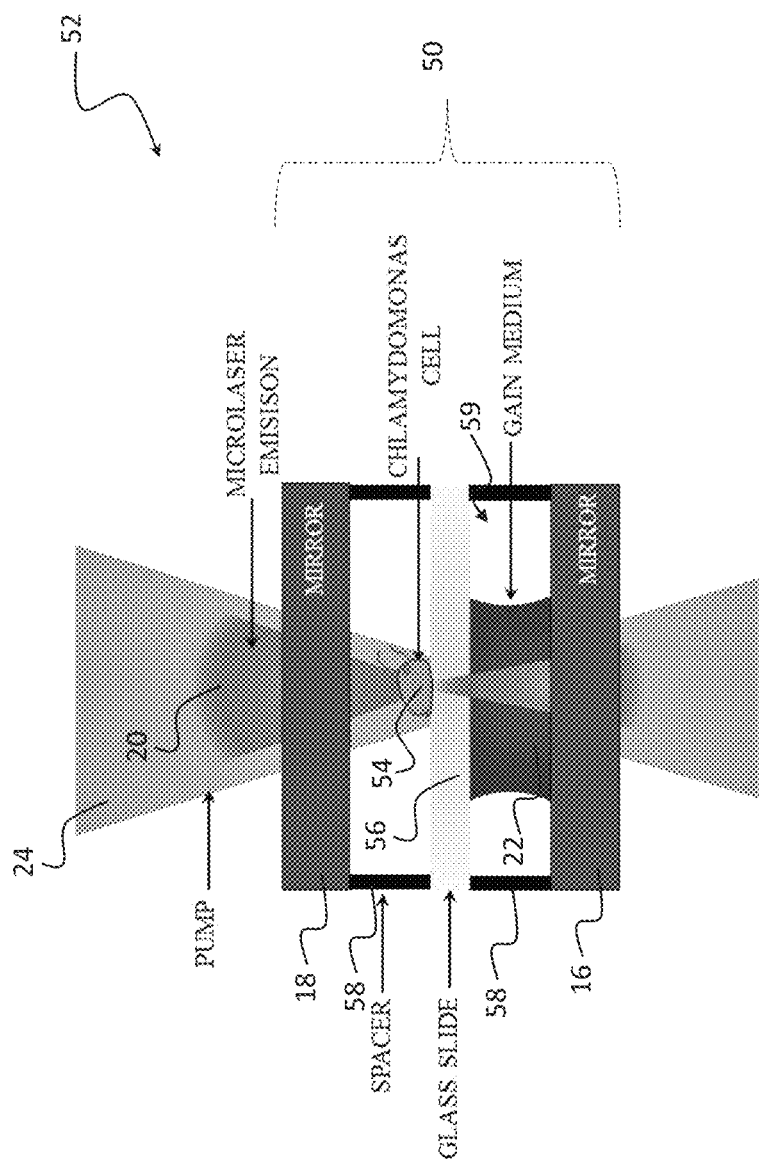
FIG. 8 is a schematic cross-sectional diagram of a variation of the FIG. 1A preferred embodiment, including a biological cell as a refractive element within the laser resonator.

FIG. 8 shows a preferred resonator 50 and laser 52 constructed in accordance with the invention. The resonator 50 includes many features that are common with the resonator 10 of FIG. 1, and such features are labelled with common reference numbers. Instead of a microsphere 14 as in FIG. 1, the resonator element is a biological element 54. The biological element, e.g., an algae single cell organism, can stabilize the resonator 50 and support lasing. The experiments at the University of Illinois used *Chlamydomonas reinhardtii*. Other microalgae cells can also be used such as, for example, Globe algae (*Volvox*). Other examples with a sufficient index of refraction include *Gonium, Pandorina, Eudorina*, and *Pleodorina*. A sufficient index of refraction is one greater than the refractive index of the surrounding medium. The biological element is situated upon a window 56, e.g., a glass slide, separated from the mirrors 16 and 18 by spacers 58 to divide a resonator volume 59 into two sections. The lower of the two sections of the resonator volume 59 contains the gain medium 22 while the upper half contains a biological solution containing living cells. Experiments have demonstrated that the motile, single-celled organism known as *Chlamydomonas reinhardtii* can serve as a resonator element. Because of the structure of these particular cells and the variation of the index of refraction across the cell, in particular, the central portion of the cell acts as a lens and lasing occurs in the resonator of FIG. 8 only when a cell ventures into the pump beam. Notice that, in this embodiment, the "lens" (resonator element) need not be in contact with either mirror of the resonator. Videos of this embodiment in operation have been obtained, and the transverse mode of the laser beam that is produced by the interaction of the cell with the resonator can serve as a diagnostic of the structure of the cell. The embodiment allows for real-time observations of cellular structure as well as the axial and longitudinal positions of motile cells as they move. Since the *Chlamydomonas* cells move in response to light, they can be used to change the properties of the emitted microlaser beam in real time. Any cell within the pump beam 24 (which can be dispersed over a broad area, maintaining a pump fluence that will not allow lasing unless a cell is present) will automatically be imaged and its instantaneous position can be recorded by a CCD camera and a computer. Thus, the position and movement of cells can be tracked in real time through the laser radiation produced.

Figure 9:
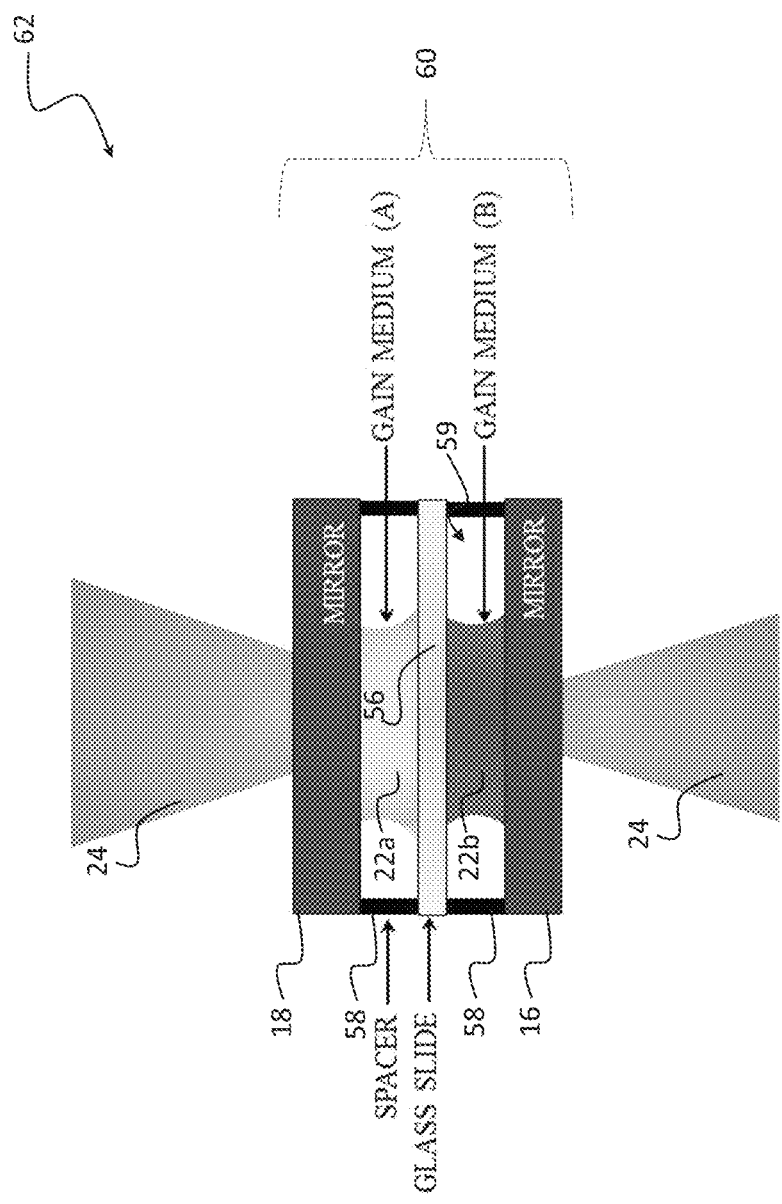
FIG. 9 is a schematic cross-sectional diagram of a variation of the FIG. 1A preferred embodiment, including a divided gain region having two separate gain media.

FIG. 9 shows a preferred resonator 60 and laser 62 constructed in accordance with the invention. The resonator 60 includes features that are common with the resonator 10 of FIGS. 1, 6 and 7, and such features are labelled with common reference numbers. The laser 62 is configured as a master oscillator-power amplifier (MOPA); it is pumped from one side, but transmission occurs through both mirrors 16 and 18. The volume 59 of the resonator between the mirrors 16 and 18 is divided into two sections, both of which exhibit optical gain and include different gain media 22a and 22b. The operation is such that one gain medium can influence the other. For example, if 22a cannot lase due to a lack of gain, then 22b can make up for this deficiency, providing the additional gain necessary for laser action. The refractive properties necessary to stabilize the resonator 60 can be supplied by microspheres (such as those of FIGS. 1, 6, and 7) on the slide 56 or by microspheres (not shown) suspended in the gain media (liquid or solid). An advantage of this embodiment is that one or both of the gain media can contain, for example, particles (such as dye or rare earth-doped spheres) that are able to supply both the refractive properties required for lasing but also provide optical gain.

Figure 10:
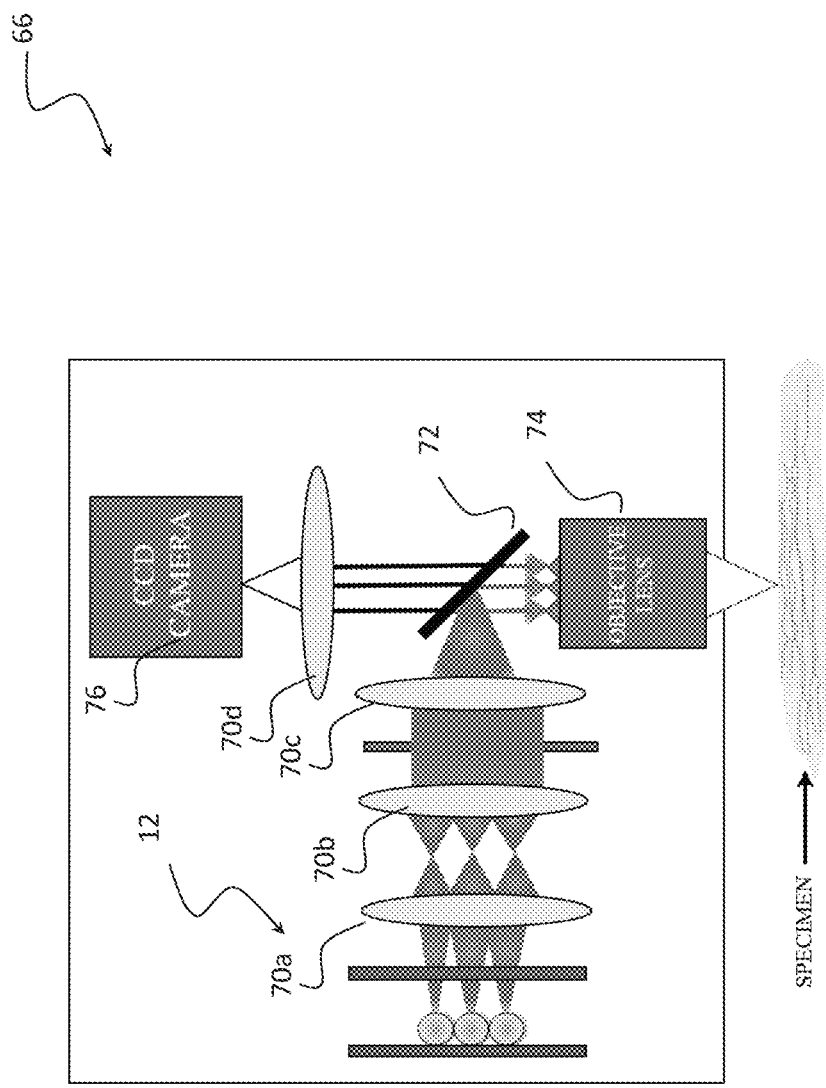
FIG. 10 is a schematic diagram of a preferred imaging system of the invention.

Lasers of the invention can be used in any standard imaging system. FIG. 10 shows a preferred embodiment imaging system 66 that exploits the multi-laser beam character of the invention to examine the microscopic structure of a surface. The system uses a laser of the invention, such as a laser 12 of FIG. 1 (though any of the lasers of the invention can be used). The laser 12 emits, for example, thousands of beams, and optical lenses 70, a mirror/beam splitter 72, and an objective lens 74 direct hundreds or thousands of laser beams onto a specimen and image the backscattered radiation onto the pixels of an image sensor 76, such as a CCD camera. The collection of light, backscattered from the sample, with a pixelated detector in conjunction with a multiplexed illumination source provided by the embodiment, results in a highly parallel confocal microscopy imaging system. Furthermore, the low spatial coherence for uncoupled arrays in the far-field enables the reduction of speckle noise when imaging biological samples, such as tissues. The system 66 is able to provide phase and amplitude data if a reference mirror is placed at the open port of the beamsplitter 72 to create an interference pattern at the image sensor 76. The phase and amplitude data retrieved from the backscatter enables images of greater contrast and resolution to be generated, in comparison with systems that record only amplitude information. Polarization information can also be obtained, through the insertion of a quarter-wave plate or polarizer into the optical pathway leading to the camera. The image sensor 76 images all of the laser beams, produced by lasers of the invention, onto a surface (through the two lenses 70a and 70b closest to the laser 12). Backscatter from the specimen, collected from all the points on the surface of the specimen at which the laser beams arrive, is then imaged onto the pixelated detector at the image sensor 76. By mapping each of the coordinates at the specimen surface onto a separate pixel of the sensor, the intensity and phase of the light emanating from each point can be recorded and stored on a computer. Analysis of this data will yield more information than is normally available with microscopic imaging systems that record and analyze only the amplitude of an optical signal. The data are easier to interpret if the array of lasers is aligned to the pixels.

Figure 11:
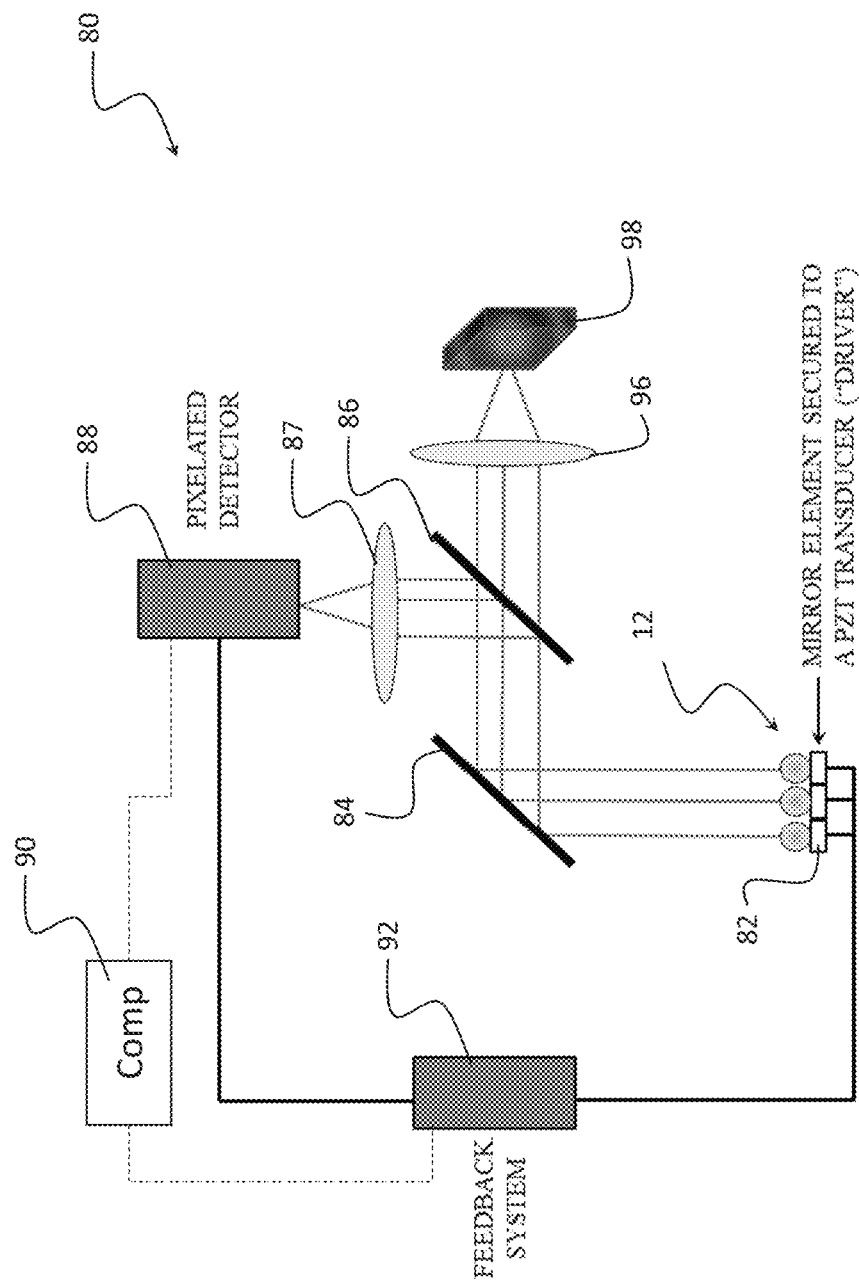
FIG. 11 is a schematic diagram of a preferred monitoring and feedback system of the invention.

FIG. 11 shows a preferred embodiment monitoring and feedback system 80 of the invention. The system uses a laser of the invention, such as a laser 12 of FIG. 1 (though any of the lasers of the invention can be used and the laser 12 is represented schematically). Multiple laser beams, e.g. thousands, are produced by the laser 12. A PZT transducer 82 is included to move each one, or groups, of a plurality of micromirrors of the laser 12. The purpose of the PZT transducer/driver 82 is to translate each microsphere, or groups of microspheres, by no more than one quarter wavelength of the laser along the path of the laser beam. That is, the transducer 82 serves to control the phase of each laser beam relative to the others. Each of the micromirrors can be mounted in an array that is secured by a frame to form effectively one segmented mirror. All of the beams from the laser are directed along an optical path established by an angled mirror 84, through a beam splitter 86 that removes a predetermined small portion, e.g. up to about 10%, of the energy from the laser beams and directs this radiation through a lens 87 onto a pixelated detector 88 which monitors the phase and amplitude of each beam relative to all of the others. A computer 90 monitors this information and directs a signal through a feedback system 92 to individual transducers 82 of the laser 12 as necessary to correct the phase of any beam that does not have the desired relationship to the phases of the other microlaser beams. In this manner, a composite laser beam (comprising literally thousands or millions of laser beams of smaller power) is constructed for which all contributing laser beams have relative phases that are carefully controlled by a monitoring and feedback system. Similar approaches have been devised for "phase combining" the outputs of multiple fiber lasers, but the physical proximity of the laser beams that can be produced in the present invention, as well as the fact that all are pumped by the same optical pump, make this embodiment of the present invention a laser system capable of generating beams of unprecedented quality. The system 80 can be designed to combine multiple laser beams by carefully controlling the phase of each of the thousands of beams produced by lasers of the invention. The monitoring and feedback system is designed to control the phases of each of the hundreds or thousands or millions of laser beams generated by embodiments of the invention. The phase of each contributing laser beam is monitored and corrections as needed are communicated to a transducer that displaces its microsphere by distances no larger than one quarter wavelength. The system 80 also shows that lens 96 shapes the beam onto a target 98 such as to produce a diffraction-limited spot suitable for laser printing.

FIGS. 12A-12B illustrate a preferred fabrication process for a resonator and laser of the invention. FIG. 12C is an image of an array of microspheres 14 affixed onto the surface of a flat mirror 16 coated with a transparent optical adhesive 102. The resonator and laser can be in accordance with FIG. 1, but a specific hexagonal pattern of 12C is achieved for the array of microspheres 14. The process entails depositing the microspheres onto a silicone (PDMS) template 104, from a liquid 106 with a glass slide 108, via convective assembly. The translation of the substrate along with the evaporation of the colloidal microsphere liquid solvent, injected between a glass slide and the substrate, forces the microspheres 14 into wells 110 of the PDMS template 104. In convective assembly, the microsphere solution is injected between the hydrophilic glass slide 108 and the substrate (PDMS) 104. As the solution evaporates and the substrate is moved, the particles are forced to settle onto the surface in the desired pattern. The patterned array of microspheres 14 is then transferred (FIG. 12B) onto the mirror 16 by flipping and contacting the microspheres 14 with the adhesive 102. Separating the template 104 and the mirror 16 leaves the microspheres 14 in the hexagonal pattern (the microspheres are arranged in a hexagonal pattern) shown in FIG. 12C.

Figure 13:
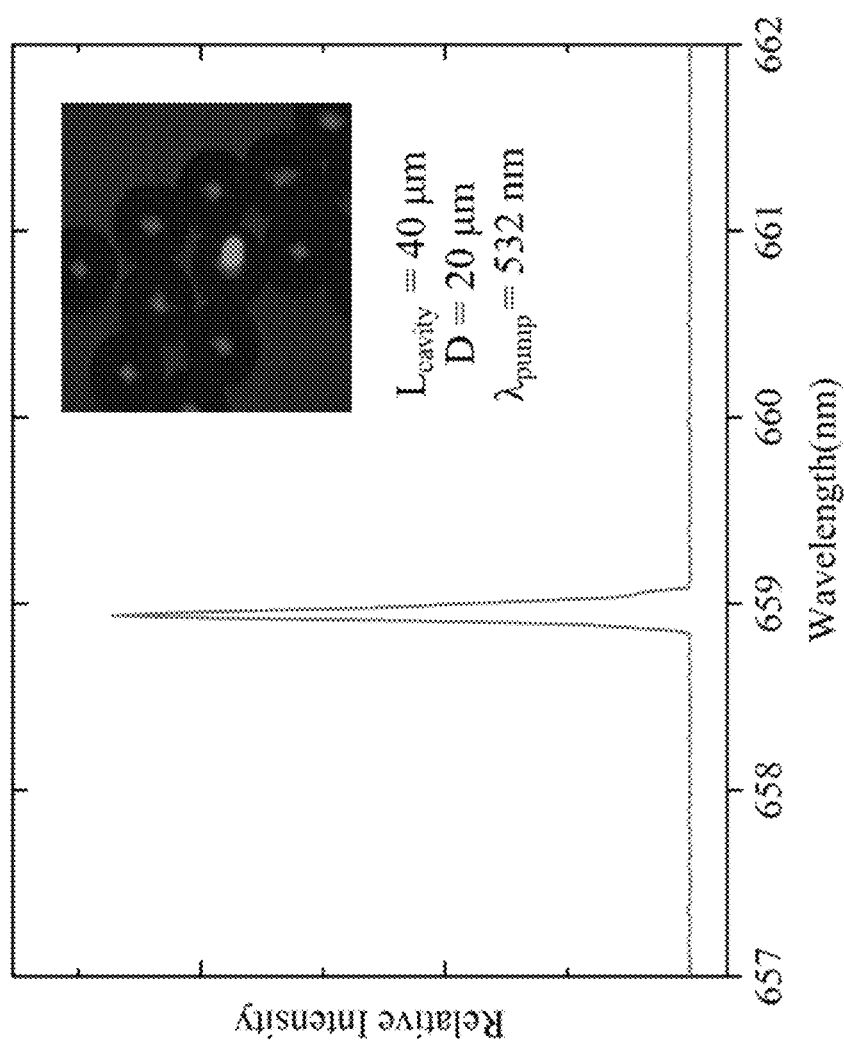
FIG. 13 includes data and an image that demonstrate single mode emission from individual microspheres in an experimental resonator and laser according to a preferred embodiment.

FIG. 13 shows data that demonstrate single mode emission from individual microspheres in a resonator according to FIG. 1A, with a gain medium of colloidal quantum dots. The data of FIG. 13 were obtained with a cavity length (distance between mirrors) of 40 µm, a microsphere diameter of 20 µm, and a pump wavelength of 532 nm. The demonstrated single mode operation is important for making high quality laser beams, particularly those requiring higher powers. A single transverse mode can be selected by adjusting the distance between the two mirrors of the optical cavity and by changing the microsphere size. Single-mode operation typically occurs for a mirror separation that is close to twice the value of the sphere diameter. In this case, single mode lasing was achieved for a 20 µm diameter sphere when the length of the optical cavity is on the order of (or less than) 2×20=40 µm.

Figure 14A:
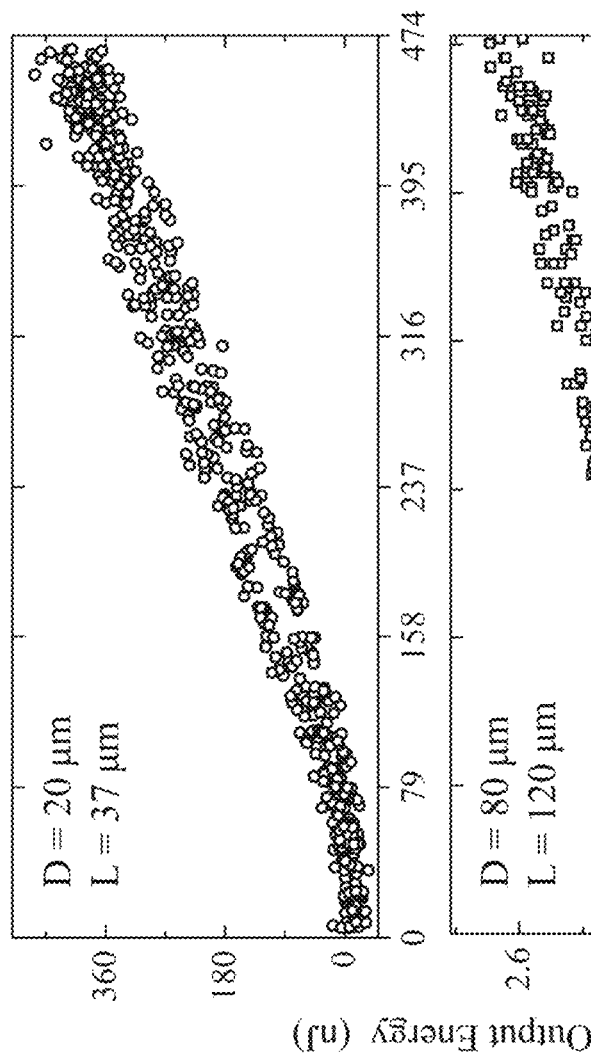
FIGS. 14A and 14B include measured data for the lasing threshold for microspheres having diameters of 80 µm and 20 µm, respectively, in a preferred embodiment.
Figure 14B:
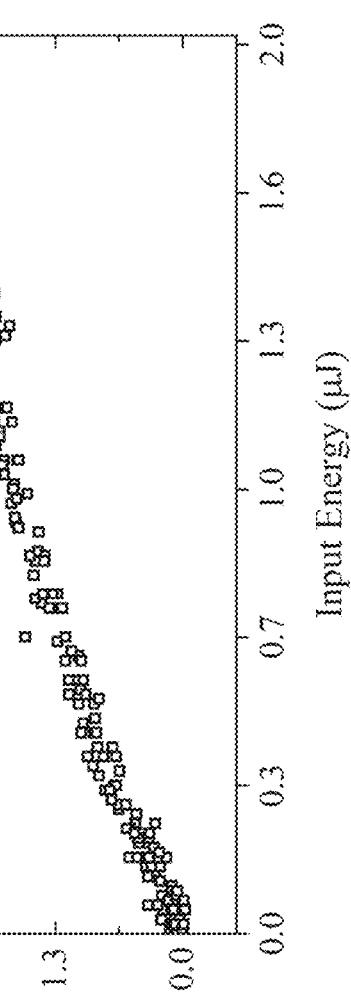

FIGS. 14A and 14B include measurements of the lasing threshold for a quantum dot gain medium and microspheres having diameters of 80 µm and 20 µm, respectively, in a laser according to FIG. 1A. The data show that the lasing threshold scales with the sphere diameter.

Figure 15:
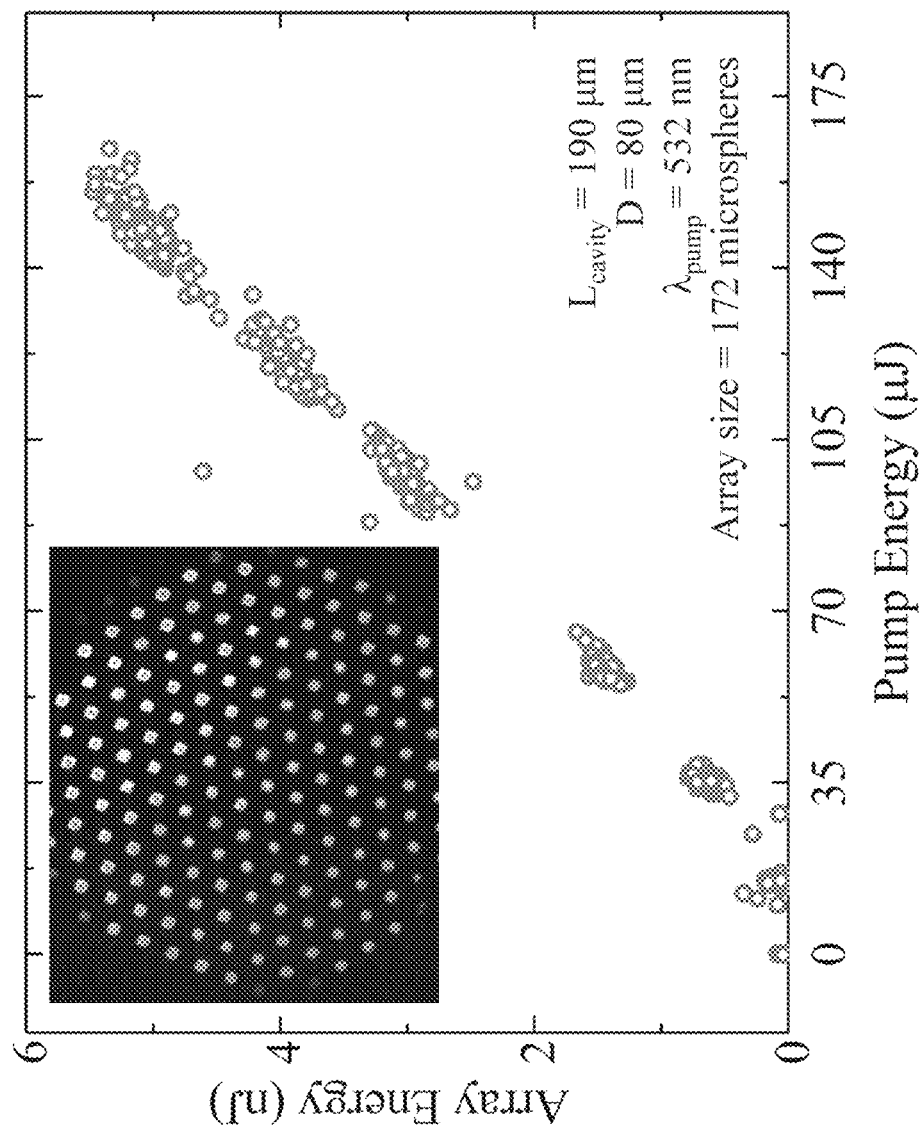
FIG. 15 includes measured data of the lasing threshold for a microlaser array of 172 spheres patterned using the method of FIGS. 12A and 12B to form a preferred embodiment laser.

FIG. 15 includes measurements of the lasing threshold for a microlaser array of 172 spheres patterned using the method of FIGS. 12A and 12B. The laser had a cavity length (distance between mirrors) of 190 µm, a microsphere diameter of 80 µm and a pump wavelength of 532 nm. In this arrangement, the region of stability will not correspond exactly to that for the experimental arrangement described above. This is a result of the additional adhesive layer in the cavity, which effectively allows one to make the cavity longer for a given sphere size, and still have it operate in the stable regime. The data show that the array of microlasers effectively behaves as a single entity having a low level of coherence.

FIG. 16 illustrates an alternative arrangement to that of FIG. 11 for controlling the phase of individual microsphere lasers by employing a spatial light modulator. In FIG. 16, two dichroic mirrors 120 and 122 are arranged with respect to a resonator or a plurality of resonators 124 to produce slightly overlapping Gaussian beams 126 that are directed into a spatial light modulator 128. By controlling the relative phase of multiple beams, the coherence of the composite laser beam (comprising multiple microlaser beams) can be adjusted and, specifically, the phase and intensity profiles of the laser beam wavefront can be specified at will.

Figure 17B:
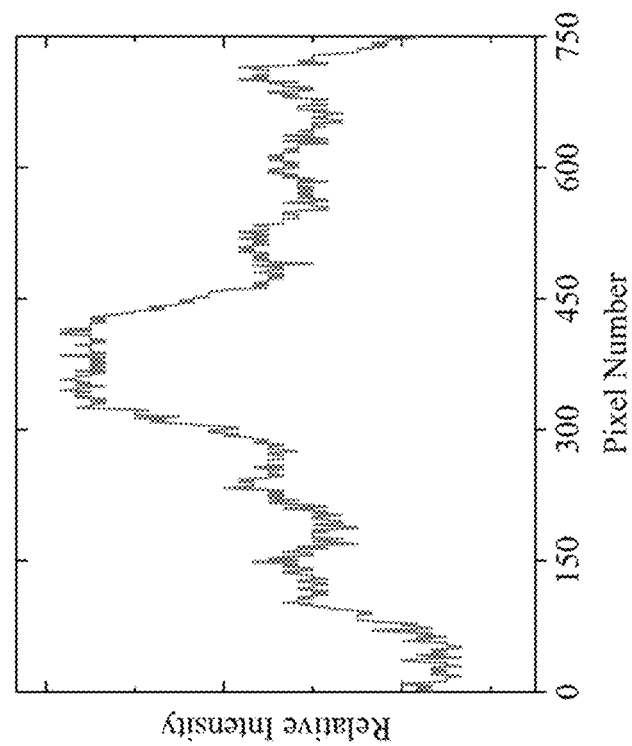
FIG. 17B is a plot of the corresponding lineout, obtained with an array of 172 microspheres.
Figure 17A:
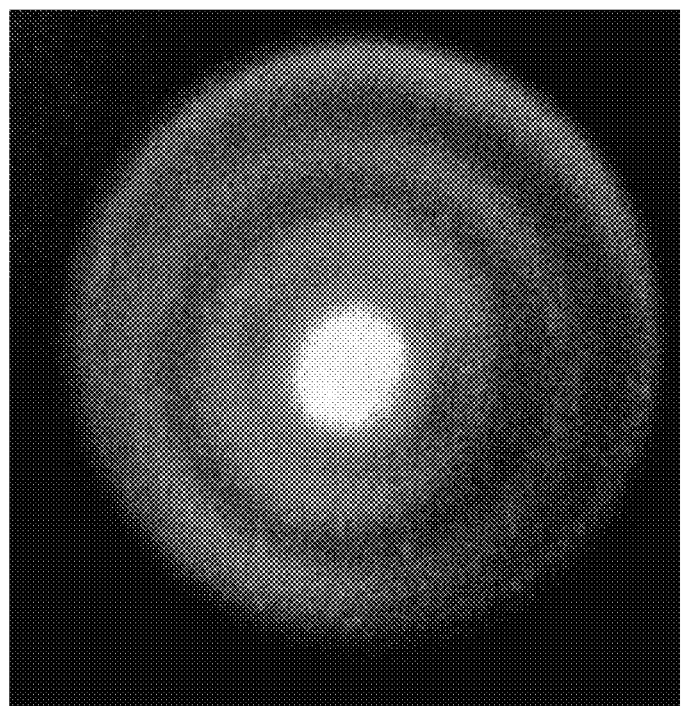
FIG. 17A is a far field image.

FIG. 17A shows the far-field intensity distribution for a resonator with an array of 172 microspheres. The reduced speckle contrast in the far-field, depicted in the lineout of FIG. 17B, is an indicator of the reduced coherence of the composite laser beam comprising the 172 microlaser beams.

Figure 18B:
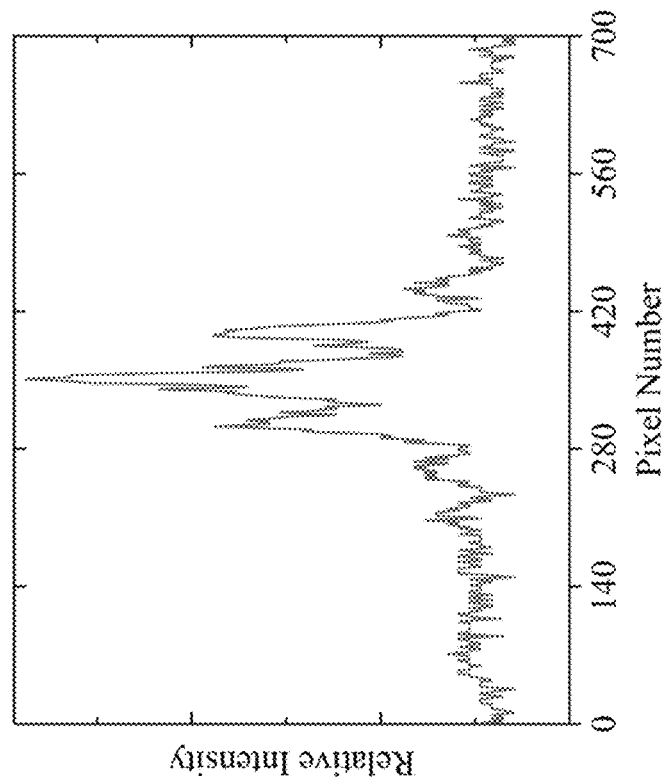
FIG. 18B is a plot of the corresponding lineout, obtained with a single microsphere refractive element.
Figure 18A:
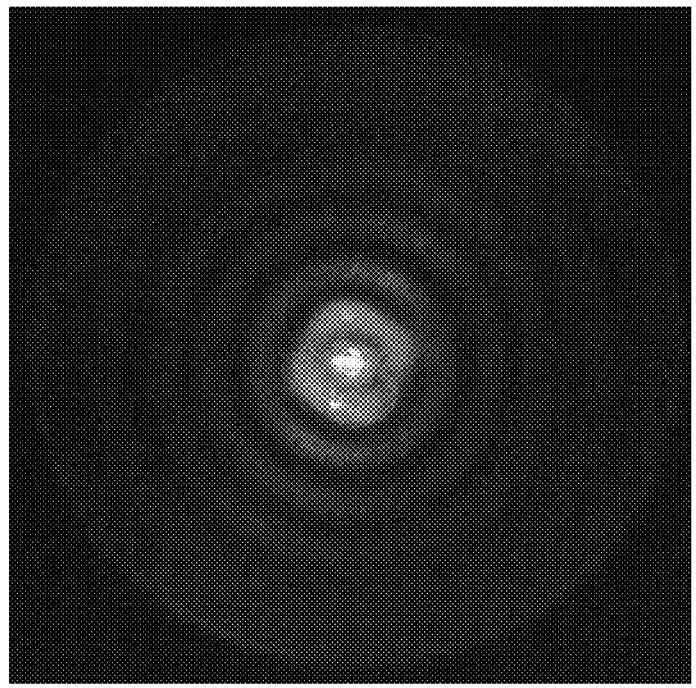
FIG. 18A is a far field image.

FIG. 18A shows the far-field intensity distribution for a single sphere of a resonator. The lineout of the image in FIG. 18B, representing the intensity profile along the horizontal line in the image, shows that the microlaser beam produced with a single microsphere has a high degree of coherence. Both FIGS. 17 and 18 confirm that, to achieve a coherent beam with good beam quality in the far-field from an array of microlasers, one must control the phases of each microsphere laser beam (such as that achieved in FIGS. 11 and/or 16).

Figure 19:
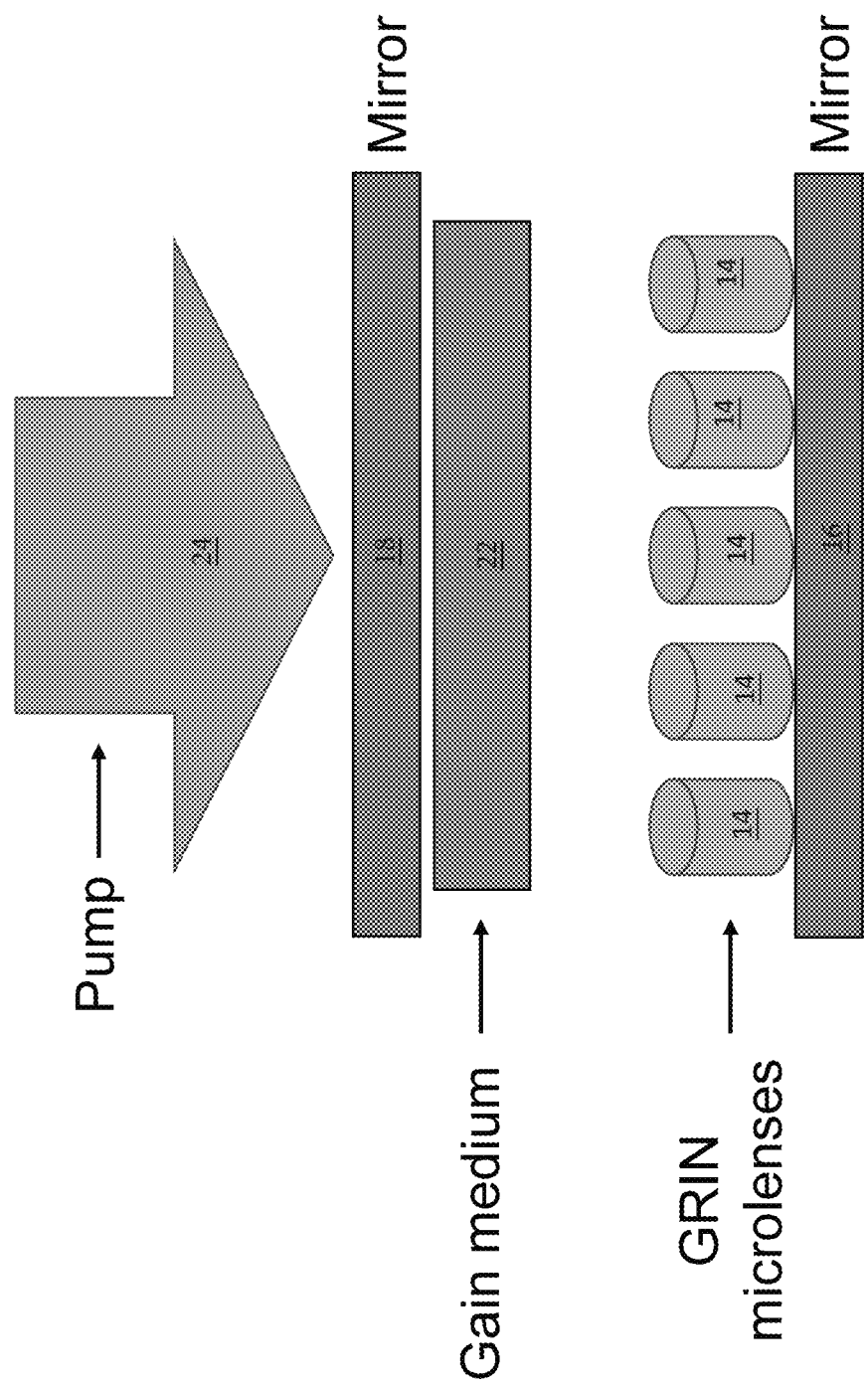
FIG. 19 is a schematic cross-sectional diagram of a variation of the FIG. 1A preferred embodiment, including gradient-index (GRIN) microlenses as microrefractive elements within the laser resonator.

FIG. 19 shows a preferred resonator constructed in accordance with the invention. The resonator includes features that are common with the resonator 10 of FIGS. 1, 6 and 7. Instead of a microsphere 14 as in FIG. 1A, the resonator element is an array of microlenses in a single gradient-index (GRIN) lens structure or a plurality of GRIN lenses with millimeter-scale or sub-millimeter diameter. Such lenses can stabilize the optical cavity in a manner similar to a microsphere. The lenses can either be separate and placed individually throughout the resonator or can be joined by a common substrate.

Figure 20:
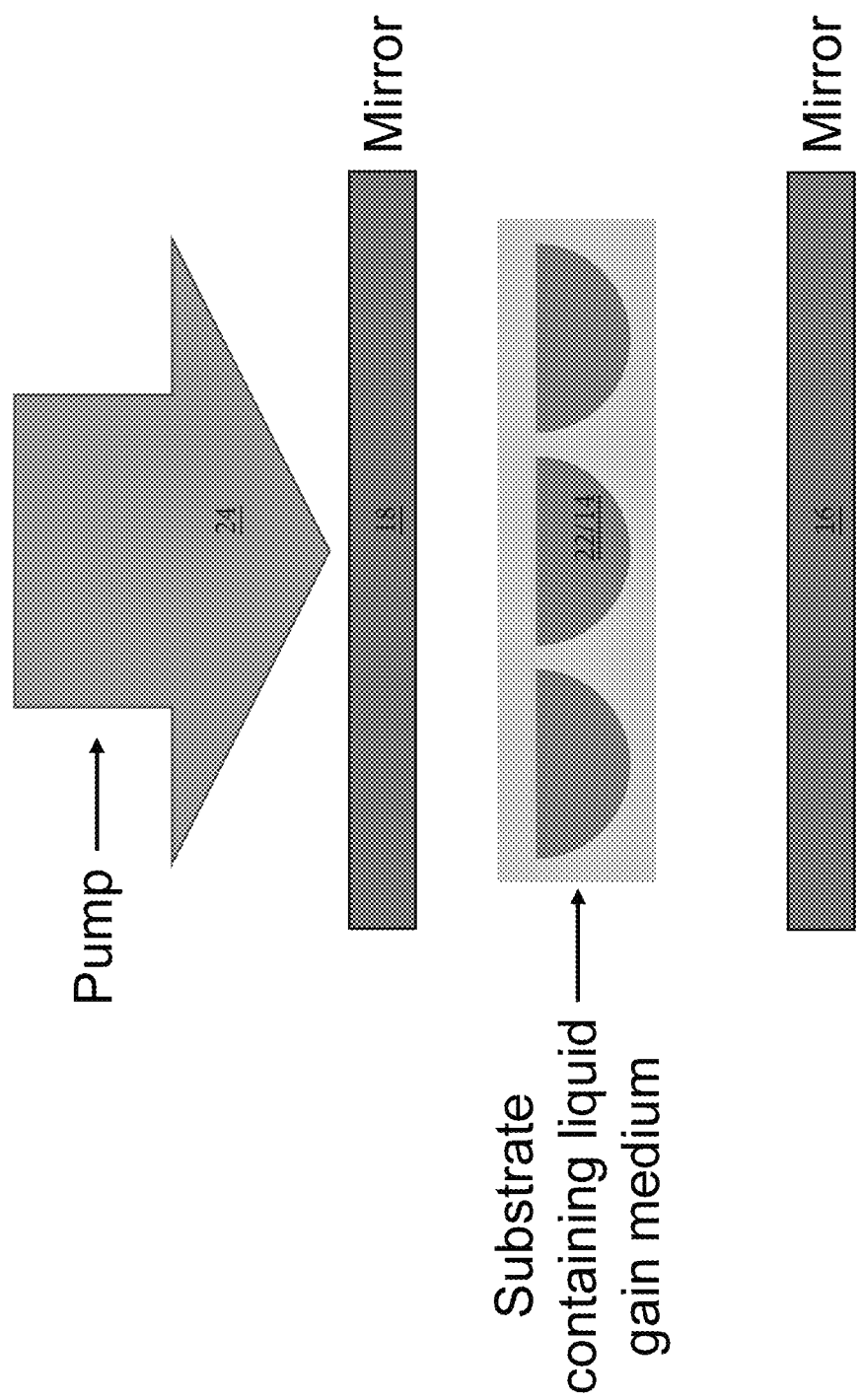
FIG. 20 is a schematic cross-sectional diagram of a variation of the FIG. 1A preferred embodiment, including a substrate containing cavities that are filled with a liquid gain medium that also function as microrefractive elements.

FIG. 20 shows a preferred resonator constructed in accordance with the invention. The resonator includes features that are common with the resonator 10 of FIGS. 1, 6, and 7. Instead of a microsphere 14 as in FIG. 1, the resonator element is a liquid gain medium that forms a lens inside an optically-transparent substrate. With a substrate that has a lower refractive index than the liquid gain medium, a liquid lens can be formed that will stabilize the optical cavity and function as a microrefractive element. For example, the liquid could be quantum dots dissolved in toluene, which has a refractive index of 1.49, and the substrate could be quartz, which has a refractive index of 1.46.

Figure 21:
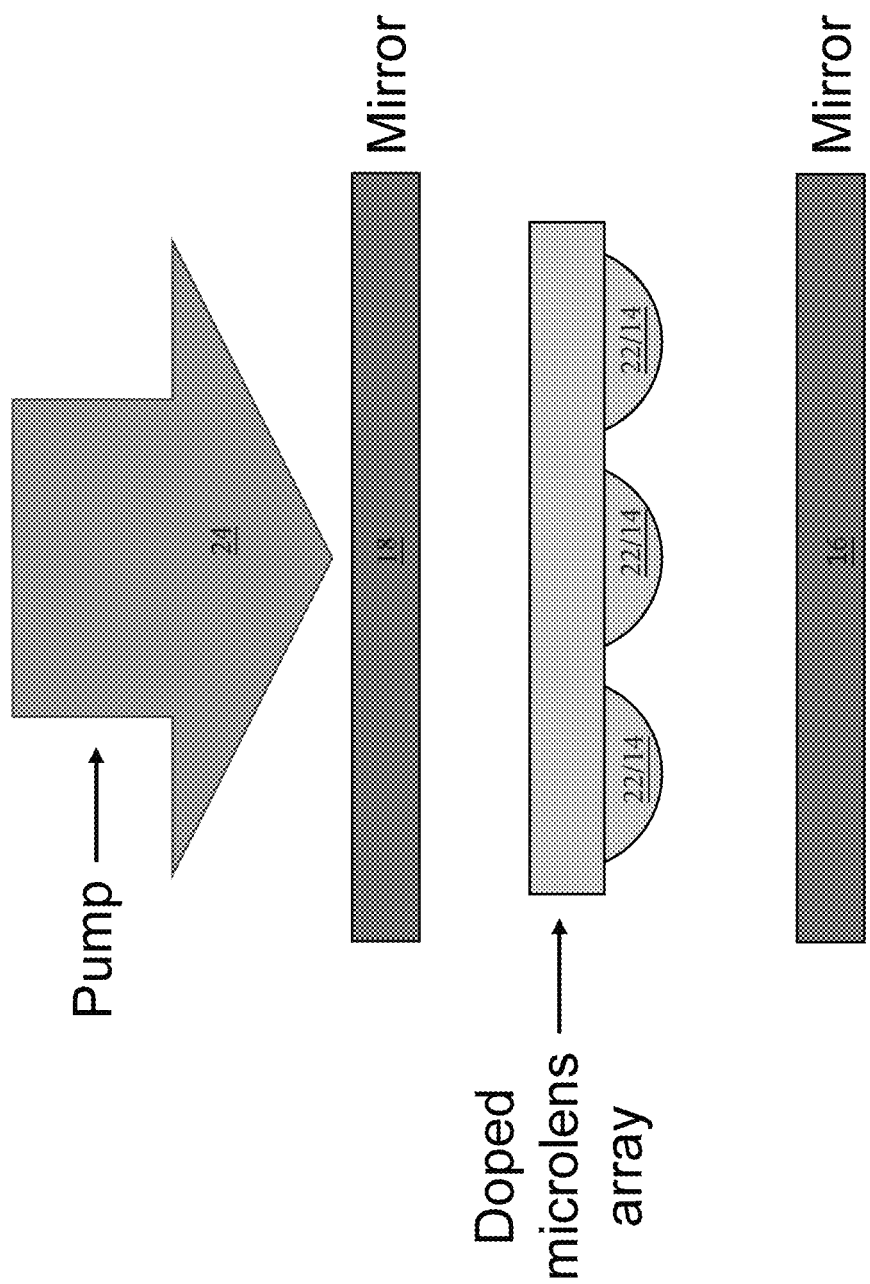
FIG. 21 is a schematic cross-sectional diagram of a variation of the FIG. 1A preferred embodiment, including a monolithic array of microrefractive elements that is doped to also function as a gain medium.

FIG. 21 shows a preferred resonator constructed in accordance with the invention. The resonator includes features that are common with the resonator 10 of FIGS. 1, 6 and 7. Instead of a microsphere 14 as in FIG. 1, the resonator element 14 is a monolithic array of spherical caps that are doped with a gain medium 22, for example, quantum dots, laser dye, or rare-earth doped ions. In this way, the resonator element 14 serves to both stabilize and provide gain for the laser resonator.

Figure 22:
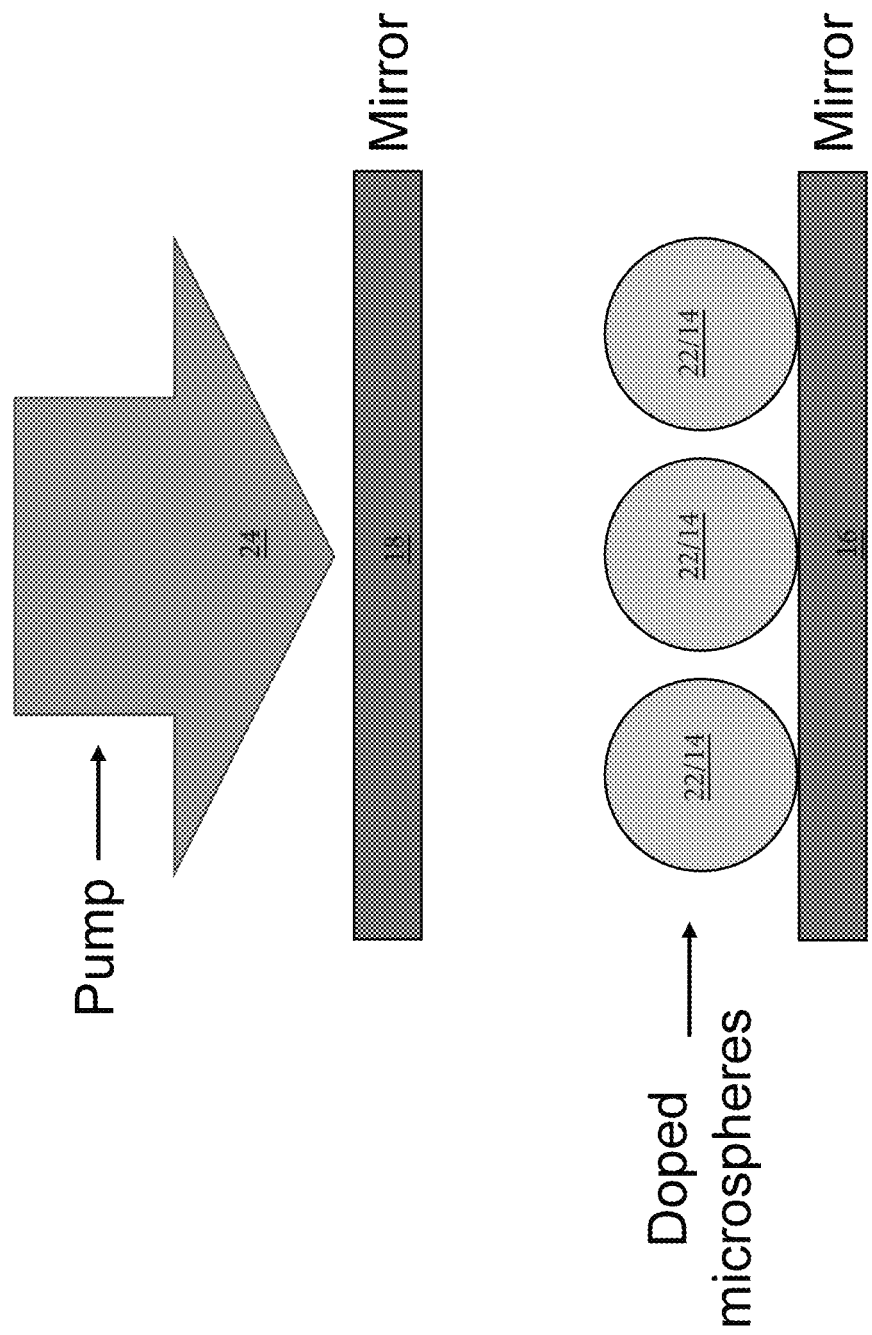
FIG. 22 is a schematic cross-sectional diagram of a variation of the FIG. 1A preferred embodiment, including microspheres as microrefractive elements that are doped so as to also function as a gain medium.

FIG. 22 shows a preferred resonator constructed in accordance with the invention. The resonator includes features that are common with the resonator 10 of FIGS. 1, 6 and 7. Instead of using a liquid or gaseous gain medium, the gain medium is directly incorporated into the microspheres 14 22 so that the resonator element provides gain and stabilizes the laser resonator. Example gain media include quantum dots, laser dyes, and rare-earth doped ions.

Figure 23:
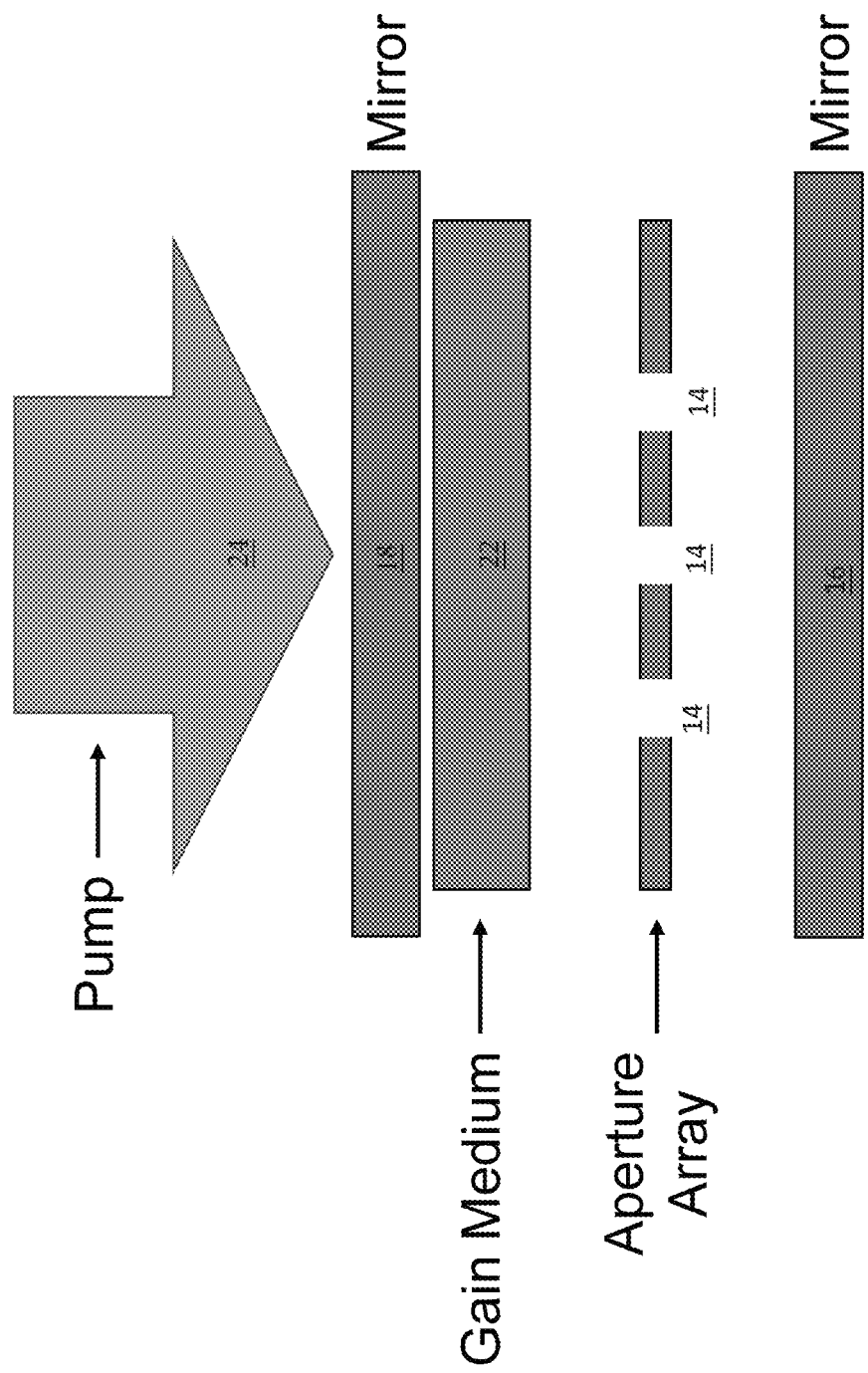
FIG. 23 is a schematic cross-sectional diagram of a variation of the FIG. 1A preferred embodiment, including an array of apertures or pinholes which, in conjunction with refraction provided by the optical Kerr effect, function as microrefractive elements.

FIG. 23 shows a preferred resonator constructed in accordance with the invention. The resonator includes features that are common with the resonator 10 of FIGS. 1, 6 and 7. Instead of a microsphere as in FIG. 1, the optical Kerr effect in conjunction with an array of apertures or pinholes serves to stabilize and pixelate the resonator, respectively, and jointly form microrefractive elements. The Kerr effect, in which the refractive index of a material is dependent on the optical intensity of the incident light, can produce a lensing effect inside a resonator. The combination of this effect and the array of apertures or pinholes that only transmit light through a series of holes will form a resonator similar to other embodiments. In addition, this preferred resonator can initiate Kerr-lens mode locking from each micro-resonator inside the laser, which enables ultrafast pulses of light to be generated with durations of picoseconds or femto seconds. Titanium-doped sapphire crystal, for example, is commonly used to produce Kerr lensing.

Figure 24:
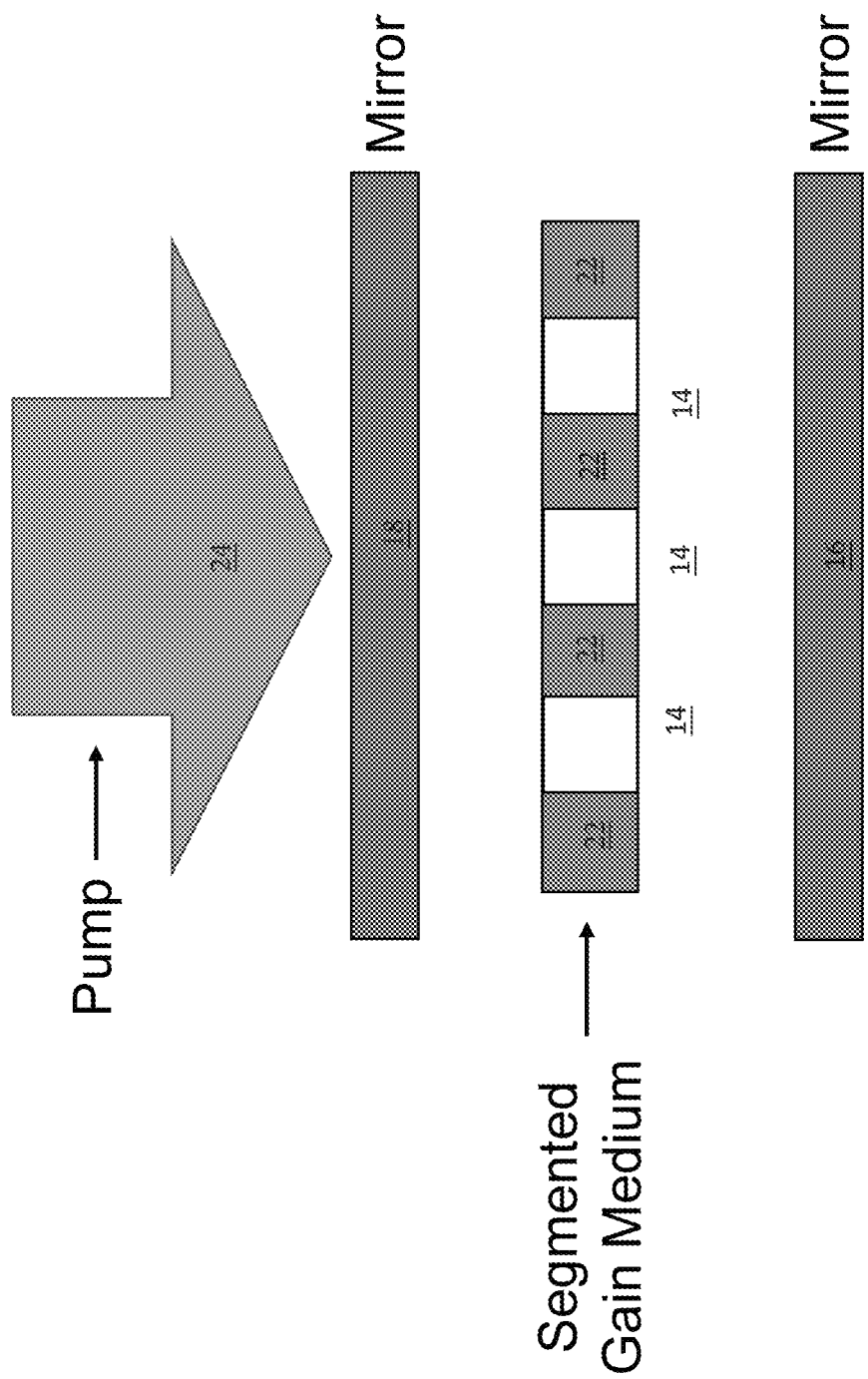
FIG. 24 is a schematic cross-sectional diagram of a variation of the FIG. 1A preferred embodiment, including a planar substrate segmented into regions either containing or lacking a gain medium; segments containing a gain medium in conjunction with refraction provided by the optical Kerr effect function as microrefractive elements.

FIG. 24 shows a preferred resonator constructed in accordance with the invention. The resonator includes features that are common with the resonator 10 of FIGS. 1, 6 and 7. Instead of a microsphere as in FIG. 1, the optical Kerr effect within a periodic gain medium can be used to stabilize the resonator. The gaps in the gain medium serve to pixelate the transverse plane of the resonator and the Kerr effect produces a lens in each segment of the gain medium to locally stabilize the resonator and function as a microrefractive element. This preferred resonator is also capable of producing pulses of light with picosecond, or possibly femtosecond, duration.

Figure 25:
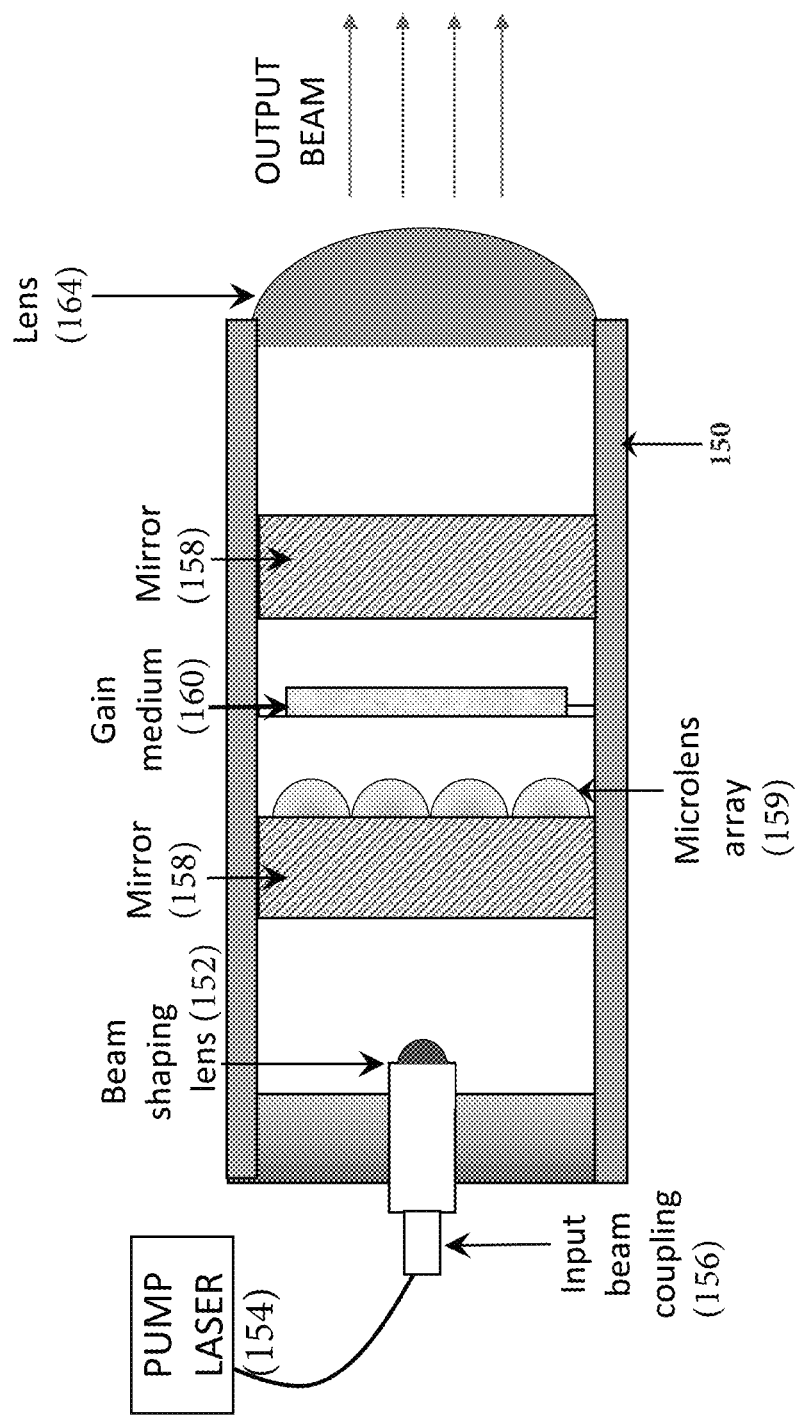
FIG. 25 illustrates a preferred embodiment laser light source for imaging systems.
Figure 26:
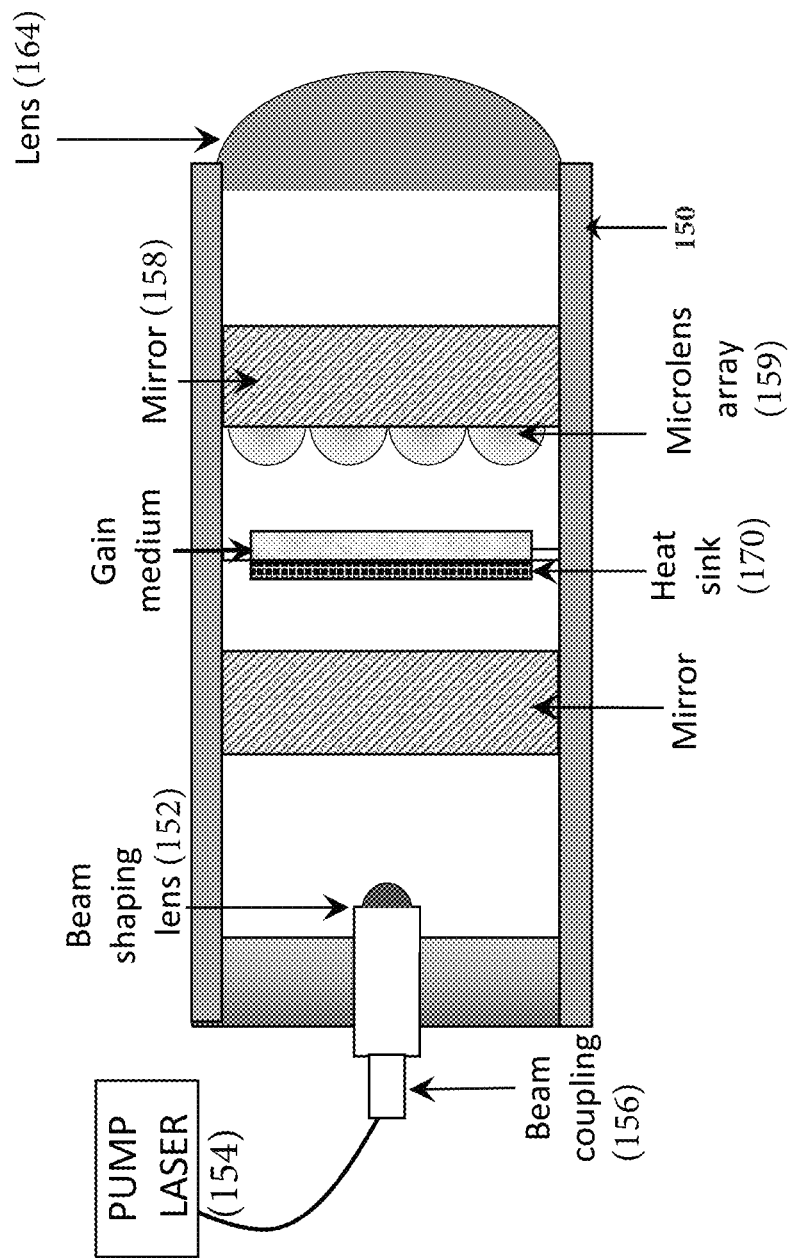
FIG. 26 illustrates a preferred embodiment laser light source consistent with the invention of FIG. 25.

FIG. 25 shows a preferred embodiment light source. A sealed enclosure 150 includes a beam-shaping lens 152 that receives pump laser light from a pump laser through an input pump beam laser coupling 156. One or both opposing mirrors 158 includes a microrefractive element/lens array 159, and a gain medium 160 is situated between the two mirrors. An output lens 164 directs microlaser beams, having a plurality of phases with respect to time, toward an imaging object. FIG. 26 shows a similar light source, with the microrefractive elements/lenses being situated on or near the mirror closest to the output lens. The elements/lenses can also be on both mirrors (in alignment with each other). The light source of FIG. 26 also includes a heat sink 170 on the gain medium.

Figure 27:
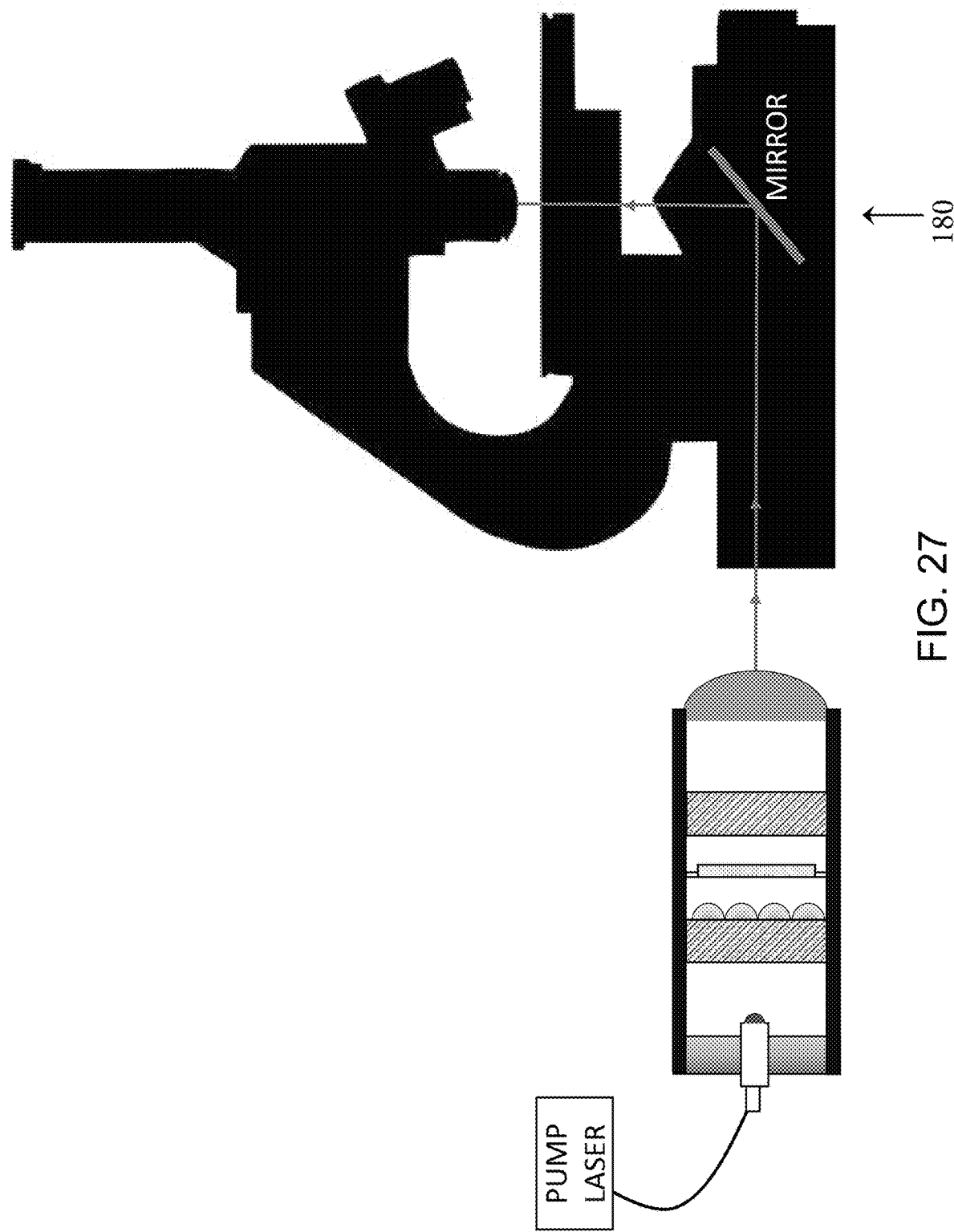
FIG. 27 illustrates a preferred retrofit light source for a microscope.

FIG. 27 shows a preferred microscope 180 and retrofit application. The output of the light source of the present invention, such as the FIG. 25 or 26 light source, is directed by one or more mirrors, illuminating a sample. Subsequently, the microscope's viewing and/or image acquisition optics obtain the image. The light source is configured to model the dimensions of a previous light source, such as a lamp or LED source.

Figure 28:
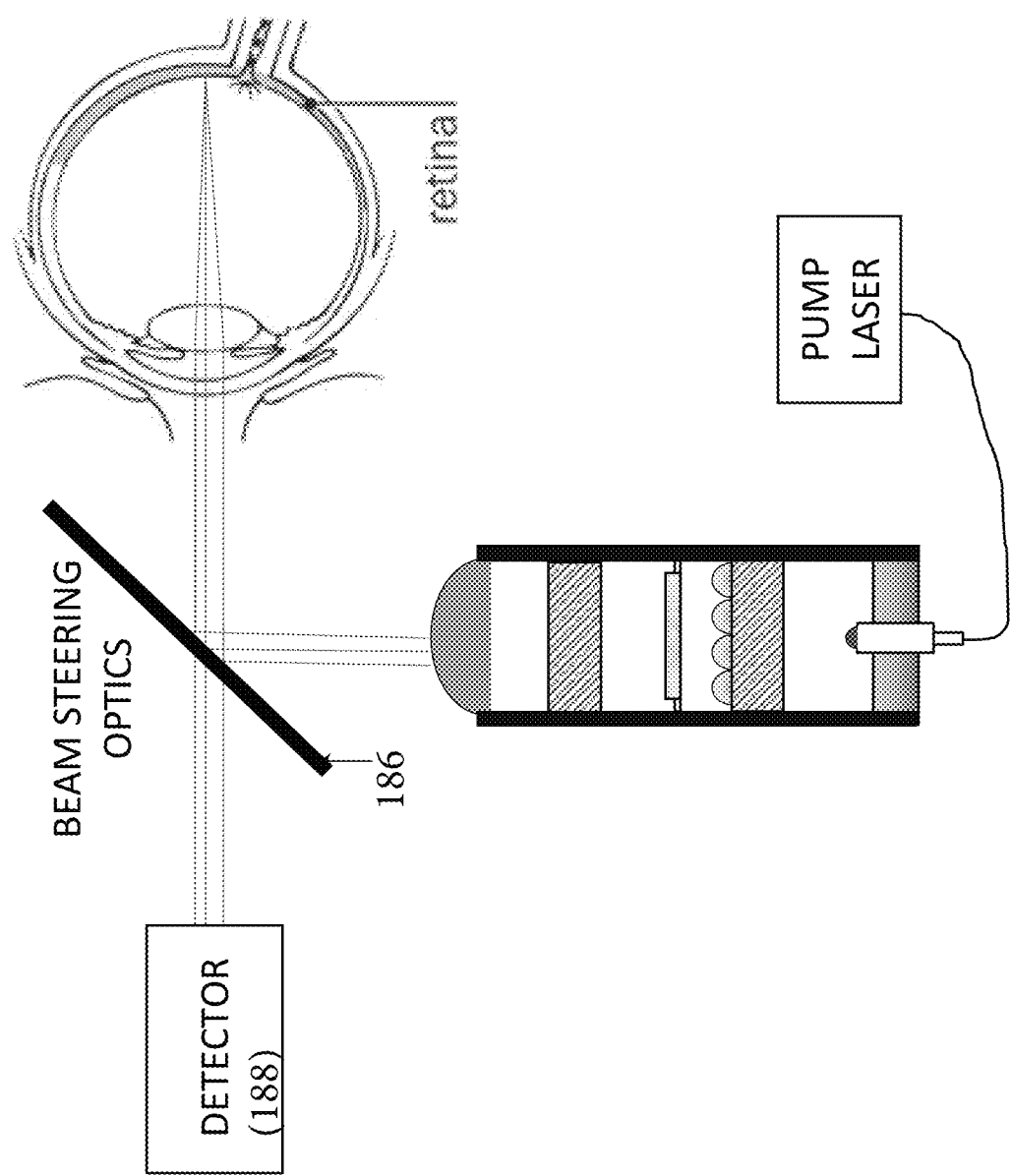
FIG. 28 illustrates a preferred retrofit light source for an ophthalmoscope.

FIG. 28 shows an application of a preferred light source in an ophthalmology system. Beam steering optics, e.g. a half mirror 186, direct the illumination from the light source toward an eye being imaged, and a detector 188 obtains the image through the half mirror.

FIG. 29 shows a preferred embodiment laser projector. In this embodiment, three lasers of the invention—red, blue, and green—are directed onto a screen under the control of a galvanometer-controlled mirror. The source is directed into an arrangement of optical components known as the optical engine or projector lens system 190 of a projector. The scanning of the three primary colors over the screen is accomplished in a manner similar to that used for laser projectors using conventional (single beam) lasers. However, in the FIG. 29 embodiment, the RGB beams are of low coherence, but nevertheless maintain the brightness and spatial resolution for which lasers are known. Therefore, the speckle that plagues conventional projectors is reduced or eliminated.

The FIGS. 25-29 embodiments of the invention provide for high-resolution microscopy and image projection, which has been tested experimentally. Various imaging techniques can benefit from the present light source that provides highly directional, high-intensity light sources for applications such as imaging LIDAR, confocal microscopy, optical coherence tomography, and quantitative phase imaging. In addition, the present light source can be used for rapidly producing "virtual slides," i.e. digital images that have a large field of view (several centimeters square or more) while maintaining sub-micron spatial resolution. This is accomplished by continually raster-scanning the small field of view of a high-resolution microscope across a large sample and acquiring an image using a laser pulse with each new field of view as the sample moves. This is a much faster solution than bringing the sample to a complete standstill before each image acquisition, as is done with conventional light sources. The present laser light source is characterized by low speckle and we have demonstrated that the image quality when using this laser as a light source is significantly enhanced relative to images acquired with conventional lasers. Further, using this method with high-peak-power pulsed lasers greatly reduces the detection system exposure time required to generate an image, as compared to lamps or LEDs. This aspect of the invention is crucial for imaging dynamic systems (cells, other biological organisms, materials subjected to a short-lived excitation source, etc.) on timescales below one microsecond.

In preferred embodiment light sources, the laser source includes, or consists of, two mirrors, a gain medium, one or more microrefractive elements and the laser pump source. One or more lenses may also be desirable. In experimental embodiments, colloidal quantum dot solutions and titanium-doped, thin sapphire disks were employed in separate experiments as the gain medium. The array of micro-refractive elements (microspheres, microlens array, etc.) serves to stabilize the optical cavity, but only at the points (positions) occupied by the micro-refractive elements. When the cavity is optically-pumped, lasing occurs only at these points because the diffraction loss is high elsewhere. Therefore, a laser array is formed. The beams are not coupled by the output lens, and experiments show no evidence in the near-field or the far-field that the lens improves the coherence of the overall laser beam. While it is often beneficial to couple beams, e.g. in VCSEL arrays, to achieve higher levels of output power, the incoherent combining of more than 100 microlaser beams that was observed in the experiments was revealed to be beneficial because the degree of speckle is reduced significantly. The speckle decreases as more lasers are incoherently combined. More specifically, the speckle contrast is inversely proportional to the square root of the number of independent lasing modes. As an example, we expect 4 lasing modes to produce about half the speckle contrast as 1 lasing mode.

Figure 30B:
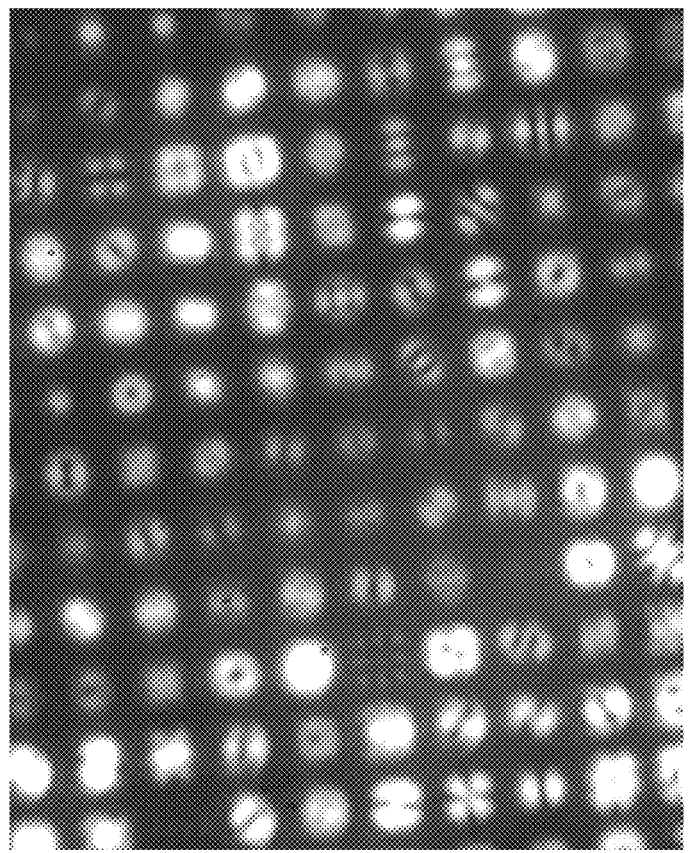
FIGS. 30A and 30B include near-field images of the experimental near-infrared laser source.
Figure 30A:
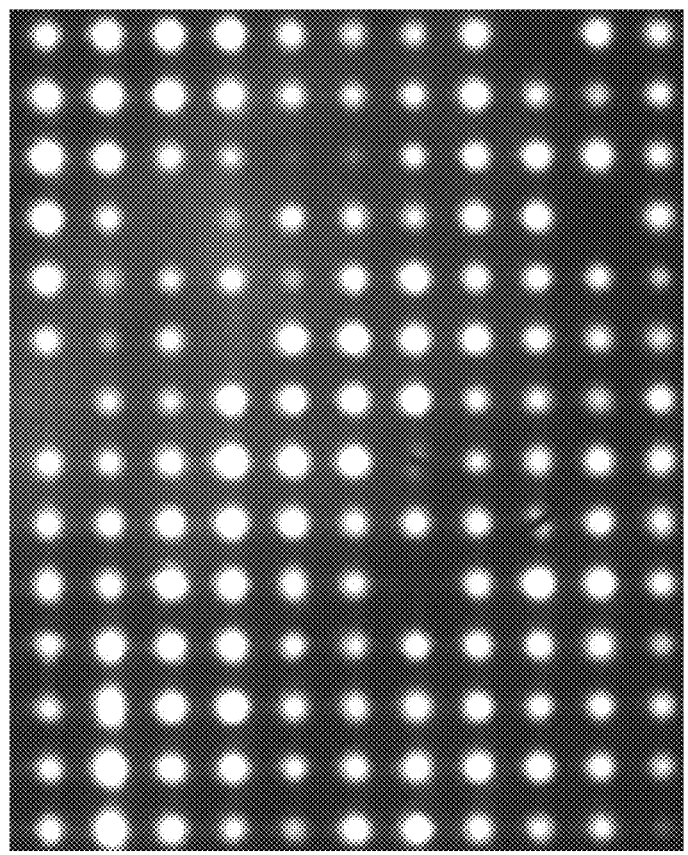

Near-field images of the experimental near-infrared laser source (false color produced by the camera), showed the individual beams inside the cavity. There were many more beams outside the field of view of the microscope, several hundred in all. In other experiments, over 1,000 simultaneous beams have been obtained, leading to a speckle contrast that is expected to be about 3% of the contrast from a single beam. Images for primarily fundamental mode lasing and higher-order mode lasing are shown in FIGS. 30A and 30B, respectively.

Figure 31A:
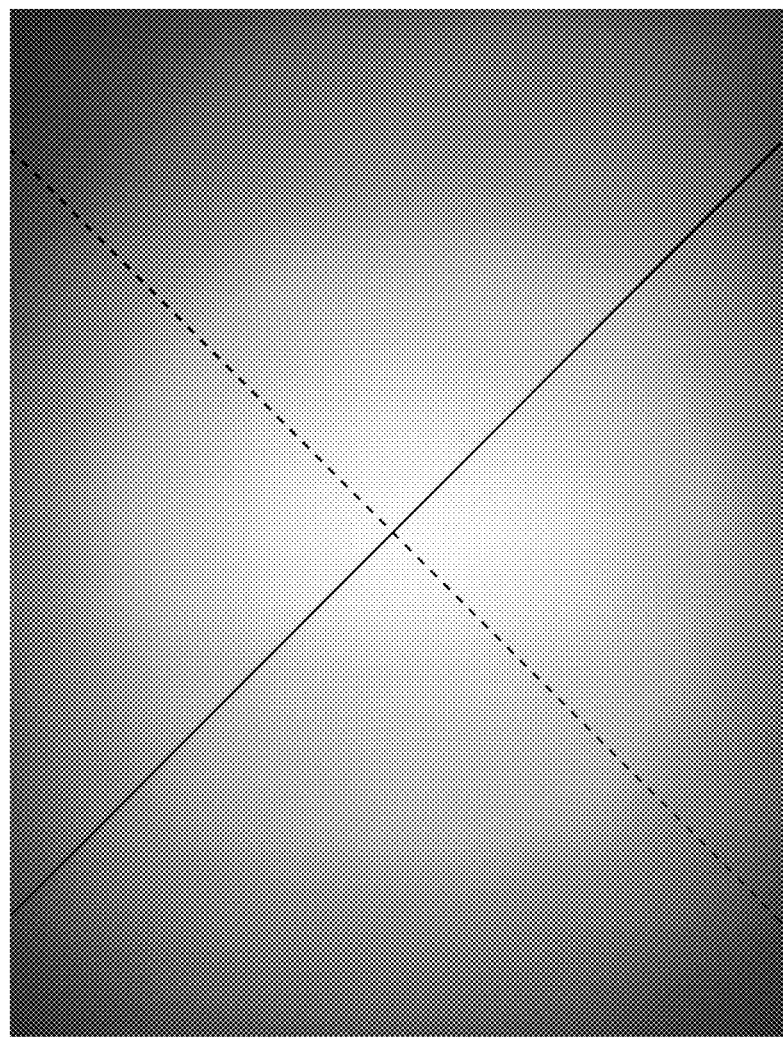
FIG. 31A includes a far-field image of the experimental near-infrared laser source.
Figure 31C:
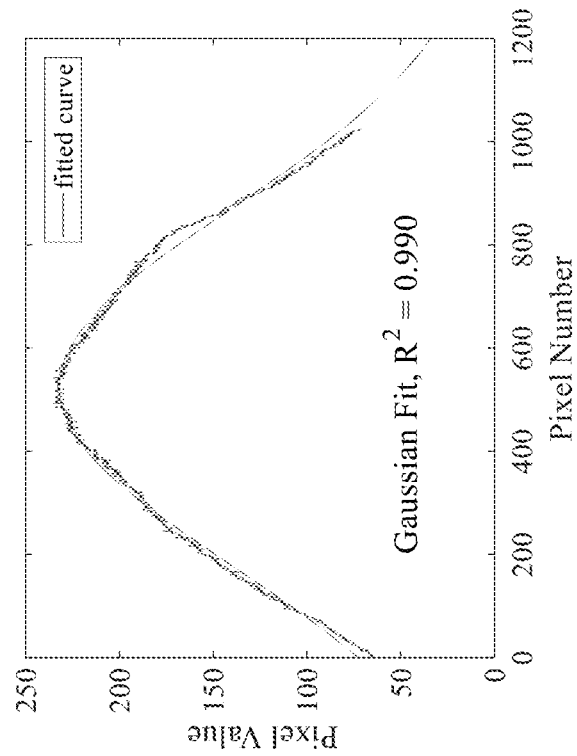
FIGS. 31B and 31C include lineouts and Gaussian fitting curves for the dashed and solid lines, respectively, in FIG. 31A.
Figure 31B:
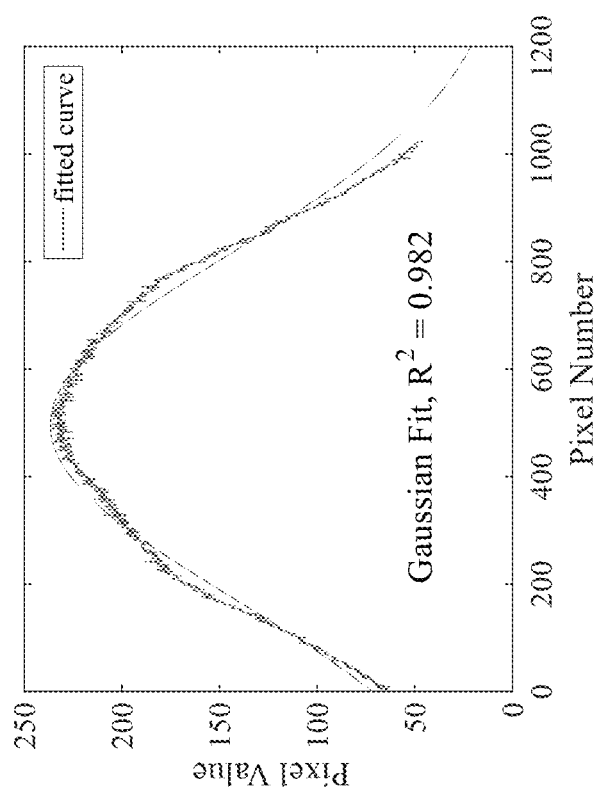

FIG. 31A shows an image of the far-field intensity of a laser resonator constructed in accordance with the invention using a titanium-doped sapphire crystal as the gain medium. Least-squares fitting of two orthogonal lineouts from this image indicate that the far-field intensity is nearly Gaussian, with the lineouts and fitted curves given in FIGS. 31B and 31C, corresponding to the dashed and solid lines, respectively, in FIG. 31A. This clearly shows that the resonator produces a composite, speckle-free beam from a multitude of lower-power beams that have uncorrelated phase fluctuations.

FIG. 32A is an image of an algae sample illuminated by the green line of a helium-neon continuous-wave (CW) laser (wavelength of 543 nm) through a diffuser, while FIG. 32B shows the same sample illuminated through a diffuser by one of our preferred near-infrared laser arrays comprising several hundred beams. Note that the effective camera exposure time for the right-hand image is about 16 ns, which is about six orders of magnitude shorter than that for the left image, demonstrating the utility of using pulsed sources for imaging, while also providing much better clarity with only a 16 ns laser pulse used for illumination. Continuous mode operation can also be used.

Figure 33B:
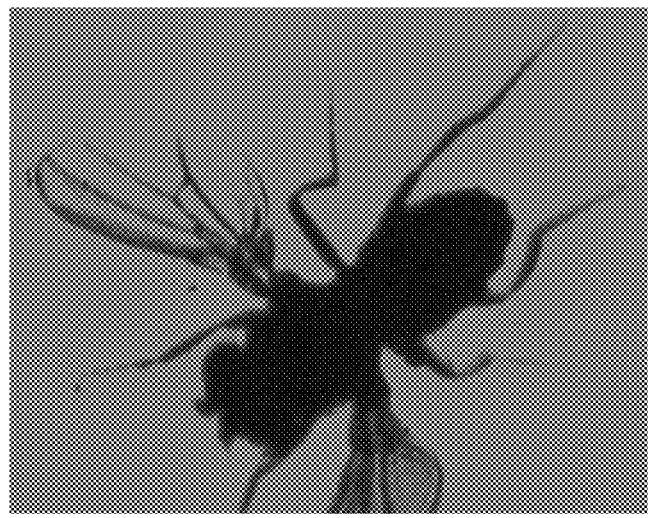
FIGS. 33A and 33B show a *Drosophila* specimen stationary and mid-flight, respectively, imaged by collecting the transmitted light from a single 5 ns pulse from a laser array consistent with the invention.
Figure 33A:
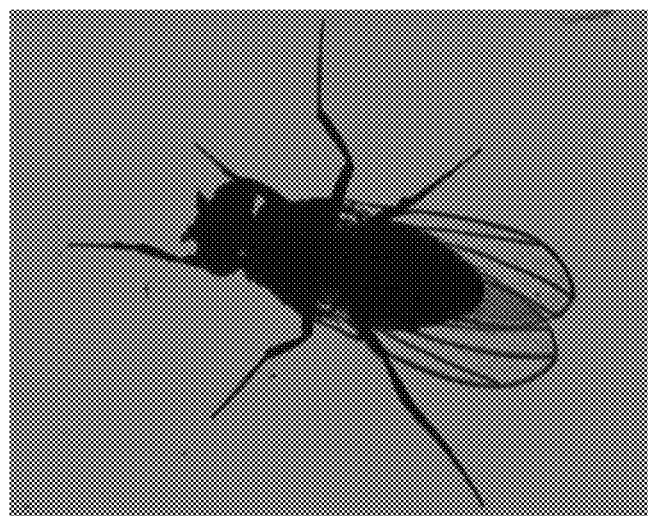

FIG. 33A shows a stationary *Drosophila* insect being imaged with the transmitted light of a single 5 ns pulse from a laser light source constructed in accordance with the invention. With this method, features as small as about 10 µm can be observed from an imaging setup approximately 20 cm away from the target. FIG. 33B shows a picture of the same specimen during flight. Despite the high frequency of a fly's wings beating, up to 200 Hz, an image of the fly could be captured with good resolution and no motion blur or speckle. This cannot be accomplished with most conventional light sources or cameras because of the small (~1 µs) maximum exposure time required to acquire such an image.

Figure 34:
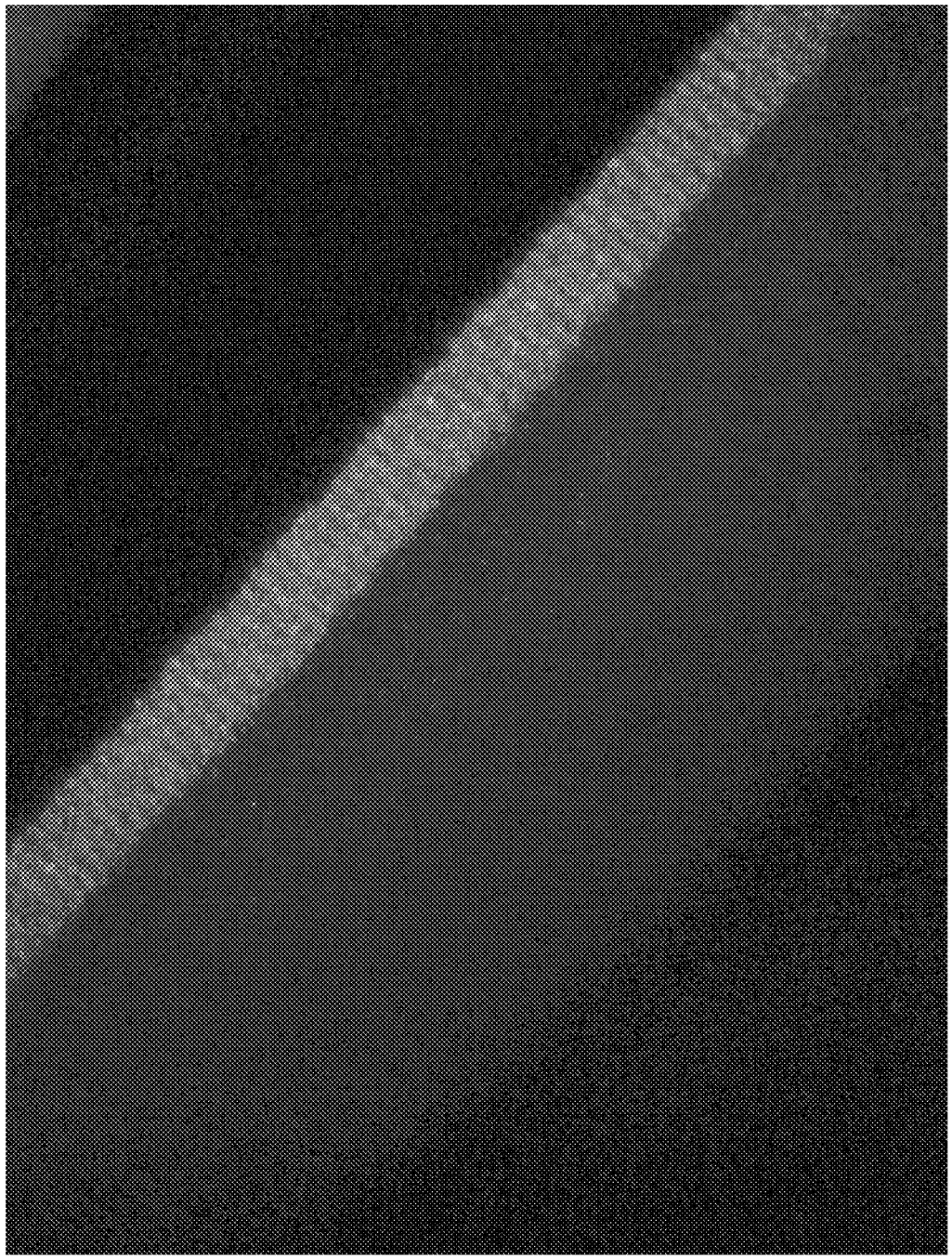
FIG. 34 shows a vane of a turbomolecular pump imaged using the reflected light from a single 5 ns pulse from a laser array consistent with the invention. The turbomolecular pump is operating at 56,000 rotations per minute, with a linear velocity exceeding 200 m/s.

FIG. 34 shows a metal vane in a turbomolecular pump blade illuminated by a light source consistent with this invention where the reflected light is imaged onto a camera. The vane is spinning at 56,000 rotations per minute, corresponding to a linear velocity of approximately 200 m/s in the field of view of the camera. With the given magnification, an exposure time below 25 ns is required to completely eliminate motion blur. Because the pulse duration of the light source was only 5 ns, the vane was successfully imaged with no motion blur or speckle. Intensity fluctuations across the image of the vane are not a speckle artefact; rather they show real details in the surface topology of the metal. For example, the bright streak in the image reveals a roughly periodic structure that results from the process of cutting the metal vane. The period of this structure is approximately 100 µm, which is several times larger than the resolution limit of the imaging system. With the imaging optics more than 20 cm from the target, these results no longer resemble microscopy. Instead, they are reminiscent of imaging LIDAR, albeit with improved spatial and temporal resolution as compared to previous realizations.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A light source for an imaging system, the light source comprising:
    a microresonator including opposing mirrors arranged substantially parallel to one another, a laser gain medium between the opposing mirrors and an array of microrefractive elements arranged to stabilize the microresonator;
    a pump laser and a lens that shapes a beam from the pump laser and directs it toward the microresonator; and
    an output lens that directs a plurality of microlaser beams from the microresonator to be incoherently combined at an object to be illuminated, wherein each of the plurality of microlaser beams is generated from the beam from the pump laser at a position of a microrefractive element in the array of microrefractive elements.

2. The light source of claim 1, wherein the plurality of microlaser beams includes beams that have phases that vary differently from one another in time.

3. The light source of claim 2, wherein the pump laser is pulsed.

4. The light source of claim 3, wherein some of the phases of individual ones of the microlaser beams cancel each other so as to remove speckle.

5. The light source of claim 4, wherein pulse timing of the pump laser is set to permit acquisition of dynamic information on a sub-microsecond time scale.

6. The light source of claim 1, wherein the laser gain medium is titanium doped sapphire or titanium dioxide.

7. The light source of claim 1, configured to retrofit into a microscope system.

8. The light source of claim 1, wherein the object is a sample and the light source is arranged in a microscope to illuminate the sample.

9. The light source of claim 1, wherein the object is an eye, and the light source is arranged in an ophthalmology system to direct the plurality of laser beams via beam steering optics toward an eye.

10. The light source of claim 1, wherein the object is a projection screen, and the light source is arranged in a projector system, and wherein the plurality of laser beams comprise three colors of light directed into the projection system from different gain media.

11. An optical microresonator, comprising:
opposing mirrors arranged substantially parallel to each other and separated to confine reflections therebetween;
an array of microrefractive elements arranged to stabilize the microresonator, the array of microrefractive elements comprising a gain medium;
a pump laser and a lens that shapes a pump laser beam and directs it toward the microresonator to generate output laser light stabilized by the array of microrefractive elements with a microlaser beam being generated at a position of each microrefractive element.

12. The resonator of claim 11, wherein the array of microrefractive elements comprises microspheres doped with quantum dots.

13. The resonator of claim 11, wherein the array of microrefractive elements comprises microspheres doped with fluorescent dye.

14. The resonator of claim 11, wherein the array of microrefractive elements comprises microspheres doped with rare-earth ions.

15. The resonator of claim 11, wherein the array of microrefractive elements comprises microspheres with a liquid or gas gain medium inside a solid shell.

16. The light source of claim 11, wherein the array of microrefractive elements comprises material exhibiting the Kerr effect.

17. The light source of claim 11, wherein the microrefractive element is a liquid gain medium within empty cavities inside a solid shell or substrate.

18. The light source of claim 11, wherein the array of microrefractive elements comprises gradient-index (GRIN) lenses.

19. The resonator of claim 11, wherein the array of microrefractive elements comprises hemispherical lenses.

20. The light source of claim 19, wherein the hemispherical lenses are doped with one or quantum dots, fluorescent dye or rare-earth-ions.

21. The light source of claim 1, wherein the object is a projection screen, and the light source is arranged in a projector system, and wherein the plurality of laser beams comprises three colors of light directed into the projection system via different filters.

* * * * *